United States Patent
Ben-David et al.

(10) Patent No.: US 9,851,599 B2
(45) Date of Patent: Dec. 26, 2017

(54) COLOR DISPLAY DEVICE COMPRISING AT LEAST SIX DIFFERENT PRIMARY COLORS

(71) Applicant: Samsung Display Co., Ltd., Gyeonggi-Do (KR)

(72) Inventors: Ilan Ben-David, Rosh Ha'ayin (IL); Shmuel Roth, Petach Tikva (IL); Moshe Ben-Chorin, Rehovot (IL)

(73) Assignee: Samsung Display Co., Ltd., Gyeonggi-Do (KR)

( * ) Notice: Subject to any disclaimer, the term of this patent is extended or adjusted under 35 U.S.C. 154(b) by 105 days.

(21) Appl. No.: 14/534,107

(22) Filed: Nov. 5, 2014

(65) Prior Publication Data

US 2015/0062144 A1 Mar. 5, 2015

Related U.S. Application Data

(60) Continuation of application No. 12/103,269, filed on Apr. 15, 2008, now Pat. No. 8,885,120, which is a
(Continued)

(51) Int. Cl.
*G02F 1/1335* (2006.01)
*G09G 3/34* (2006.01)
(Continued)

(52) U.S. Cl.
CPC ....... *G02F 1/133514* (2013.01); *G02B 5/201* (2013.01); *G02F 1/134309* (2013.01);
(Continued)

(58) Field of Classification Search
CPC .................. G02F 2201/52; G09G 2340/06
See application file for complete search history.

(56) References Cited

U.S. PATENT DOCUMENTS 3,699,244 A 10/1972 Cohen et al.
3,870,517 A 3/1975 Ota et al.
(Continued)

FOREIGN PATENT DOCUMENTS

EP 0 367 848 5/1990
EP 0 547 603 6/1993
(Continued)

OTHER PUBLICATIONS

U.S. Appl. No. 60/255,914, dated Dec. 18, 2000, Ben-David et al.
(Continued)

*Primary Examiner* — Paul Lee
(74) *Attorney, Agent, or Firm* — Pearl Cohen Zedek Latzer Baratz LLP

(57) ABSTRACT

A color Liquid Crystal Display (LCD) device for displaying a color image using at least four different primary colors, the device including an array of Liquid Crystal (LC) elements, driving circuitry adapted to receive an input corresponding to the color image and to selectively activate the LC elements of the LC array to produce an attenuation pattern corresponding to a gray-level representation of the color image, and an array of color sub-pixel filter elements juxtaposed and in registry with the array of LC elements such that each color sub-pixel filter element is in registry with one of the LC elements, wherein the array of color sub-pixel filter elements comprises at least four types of color sub-pixel filter elements, which transmit light of the at least four primary colors, respectively.

7 Claims, 15 Drawing Sheets

Related U.S. Application Data division of application No. 11/882,491, filed on Aug. 2, 2007, now Pat. No. 7,995,019, which is a continuation of application No. 10/480,280, filed as application No. PCT/IL02/00452 on Jun. 11, 2002, now Pat. No. 7,268,757.

(60) Provisional application No. 60/296,767, filed on Jun. 11, 2001, provisional application No. 60/318,626, filed on Sep. 13, 2001, provisional application No. 60/371,419, filed on Apr. 11, 2002.

(51) Int. Cl.
  *G09G 3/36* (2006.01)
  *G09G 5/02* (2006.01)
  *G02B 5/20* (2006.01)
  *H04N 9/67* (2006.01)
  *G02F 1/1343* (2006.01)
  *G09G 3/20* (2006.01)

(52) U.S. Cl.
  CPC ......... *G09G 3/3413* (2013.01); *G09G 3/3607* (2013.01); *G09G 5/02* (2013.01); *H04N 9/67* (2013.01); *G02F 2001/134345* (2013.01); *G02F 2201/52* (2013.01); *G09G 3/20* (2013.01); *G09G 3/2003* (2013.01); *G09G 3/3406* (2013.01); *G09G 2300/0452* (2013.01); *G09G 2310/0235* (2013.01); *G09G 2340/0407* (2013.01); *G09G 2340/0457* (2013.01); *G09G 2340/06* (2013.01)

(56) References Cited

U.S. PATENT DOCUMENTS

| | | |
|---|---|---|
| 4,390,893 A | 6/1983 | Russell et al. |
| 4,751,535 A | 6/1988 | Myers |
| 4,800,375 A | 1/1989 | Silverstein et al. |
| 4,843,381 A | 6/1989 | Baron |
| 4,843,573 A | 6/1989 | Taylor et al. |
| 4,892,391 A | 1/1990 | Stewart et al. |
| 4,952,972 A | 8/1990 | Someya |
| 4,953,953 A | 9/1990 | Fergason |
| 4,985,853 A | 1/1991 | Taylor et al. |
| 4,994,901 A | 2/1991 | Parulski et al. |
| 5,042,921 A | 8/1991 | Sato et al. |
| 5,087,610 A | 2/1992 | Hed |
| 5,184,114 A | 2/1993 | Brown |
| 5,191,450 A | 3/1993 | Yajima et al. |
| 5,214,418 A | 5/1993 | Fukumura et al. |
| 5,233,183 A | 8/1993 | Field |
| 5,233,385 A | 8/1993 | Sampsell |
| 5,243,414 A | 9/1993 | Dalrymple et al. |
| 5,337,068 A | 8/1994 | Stewart et al. |
| 5,345,322 A * | 9/1994 | Fergason ............ C09K 19/544 349/79 |
| 5,375,002 A | 12/1994 | Kim et al. |
| 5,416,890 A | 5/1995 | Beretta |
| 5,447,811 A | 9/1995 | Buhr et al. |
| 5,455,600 A | 10/1995 | Friedman et al. |
| 5,563,621 A | 10/1996 | Silsby |
| 5,592,188 A | 1/1997 | Doherty et al. |
| 5,614,925 A | 3/1997 | Braudaway et al. |
| 5,631,734 A | 5/1997 | Stern et al. |
| 5,642,176 A | 6/1997 | Abukawa et al. |
| 5,643,176 A | 7/1997 | Persidsky |
| 5,650,942 A | 7/1997 | Granger |
| 5,657,036 A | 8/1997 | Markandey et al. |
| 5,724,062 A | 3/1998 | Hunter |
| 5,736,754 A | 4/1998 | Shi et al. |
| 5,740,334 A | 4/1998 | Lin et al. |
| 5,751,385 A | 5/1998 | Heinze |
| 5,784,038 A | 7/1998 | Irwin |
| 5,821,913 A | 10/1998 | Mamiya |
| 5,835,099 A | 11/1998 | Marimont |
| 5,841,492 A | 11/1998 | Iwauchi et al. |
| 5,841,494 A | 11/1998 | Hall |
| 5,844,540 A | 12/1998 | Terasaki |
| 5,844,699 A | 12/1998 | Usami et al. |
| 5,863,125 A | 1/1999 | Doany |
| 5,870,530 A | 2/1999 | Balasubramanian |
| 5,872,898 A | 2/1999 | Mahy |
| 5,892,891 A | 4/1999 | Dalal et al. |
| 5,909,227 A | 6/1999 | Silverbrook |
| 5,936,617 A | 8/1999 | Uchino et al. |
| 5,982,347 A | 11/1999 | Shigeta et al. |
| 5,982,541 A | 11/1999 | Li et al. |
| 5,999,153 A | 12/1999 | Lind et al. |
| 6,018,237 A | 1/2000 | Havel |
| 6,058,207 A | 5/2000 | Tuijn et al. |
| 6,069,601 A | 5/2000 | Lind et al. |
| 6,072,464 A | 6/2000 | Ozeki |
| 6,097,367 A | 8/2000 | Kuriwaki et al. |
| 6,100,861 A | 8/2000 | Cohen et al. |
| 6,115,016 A | 9/2000 | Yoshihara et al. |
| 6,144,420 A | 11/2000 | Jung |
| 6,147,720 A | 11/2000 | Guerinot et al. |
| 6,147,728 A | 11/2000 | Okumura et al. |
| 6,160,596 A | 12/2000 | Sylvester et al. |
| 6,191,826 B1 | 2/2001 | Murakami et al. |
| 6,198,512 B1 | 3/2001 | Harris |
| 6,220,710 B1 | 4/2001 | Raj et al. |
| 6,224,216 B1 | 5/2001 | Parker et al. |
| 6,231,190 B1 | 5/2001 | Dewald |
| 6,236,390 B1 | 5/2001 | Hitchcock |
| 6,236,406 B1 | 5/2001 | Li |
| 6,239,783 B1 | 5/2001 | Hill et al. |
| 6,243,070 B1 | 6/2001 | Hill et al. |
| 6,246,396 B1 | 6/2001 | Gibson et al. |
| 6,256,073 B1 | 7/2001 | Pettitt |
| 6,259,430 B1 | 7/2001 | Riddle et al. |
| 6,262,710 B1 | 7/2001 | Smith |
| 6,262,744 B1 | 7/2001 | Carrein |
| 6,280,034 B1 | 8/2001 | Brennesholtz |
| 6,304,237 B1 | 10/2001 | Karakawa |
| 6,324,006 B1 | 11/2001 | Morgan |
| 6,366,291 B1 | 4/2002 | Taniguchi et al. |
| 6,380,961 B1 | 4/2002 | Van Der Loop et al. |
| 6,384,839 B1 | 5/2002 | Paul |
| 6,388,648 B1 | 5/2002 | Clifton et al. |
| 6,407,766 B1 | 6/2002 | Ramanujan et al. |
| 6,456,301 B1 | 9/2002 | Huang |
| 6,459,425 B1 | 10/2002 | Holub et al. |
| 6,467,910 B1 | 10/2002 | Sato |
| 6,498,592 B1 | 12/2002 | Matthies |
| 6,515,729 B1 * | 2/2003 | Hoshino ............ G02F 1/133305 349/113 |
| 6,538,742 B1 | 3/2003 | Ohsawa |
| 6,570,584 B1 * | 5/2003 | Cok .................... G09G 3/3216 345/690 |
| 6,577,291 B2 | 6/2003 | Hill et al. |
| 6,580,482 B1 | 6/2003 | Hiji et al. |
| 6,594,387 B1 | 7/2003 | Pettitt et al. |
| 6,595,648 B1 | 7/2003 | Woodgate et al. |
| 6,633,302 B1 | 10/2003 | Ohsawa et al. |
| 6,687,414 B1 | 2/2004 | Edgar |
| 6,707,516 B1 | 3/2004 | Johnson et al. |
| 6,750,992 B1 | 6/2004 | Holub |
| 6,790,484 B2 | 9/2004 | Mann |
| 6,833,888 B2 | 12/2004 | Song et al. |
| 6,870,523 B1 | 3/2005 | Ben-David et al. |
| 6,882,384 B1 | 4/2005 | Sharp |
| 6,897,876 B2 | 5/2005 | Murdoch et al. |
| 6,952,194 B1 | 10/2005 | Yamazaki et al. |
| 6,972,736 B1 | 12/2005 | Wada et al. |
| 7,129,955 B2 | 10/2006 | Motomura |
| 7,136,083 B2 | 11/2006 | Tezuka et al. |
| 7,206,005 B2 | 4/2007 | Yamashita et al. |
| 7,268,757 B2 | 9/2007 | Ben-David et al. |
| 7,352,488 B2 | 4/2008 | Ben-Chorin et al. |
| 7,492,379 B2 | 2/2009 | Credelle et al. |
| 7,995,019 B2 | 8/2011 | Ben-David et al. |
| 8,248,440 B2 | 8/2012 | Ben-David et al. |

(56) References Cited

U.S. PATENT DOCUMENTS

| | | |
|---|---|---|
| 2001/0035922 A1 | 11/2001 | Park et al. |
| 2002/0005829 A1 | 1/2002 | Ouchi |
| 2002/0015046 A1 | 2/2002 | Okada et al. |
| 2002/0024618 A1 | 2/2002 | Imai |
| 2002/0051111 A1 | 5/2002 | Greene et al. |
| 2002/0054424 A1 | 5/2002 | Miles |
| 2002/0060689 A1 | 5/2002 | Iwata et al. |
| 2002/0061369 A1 | 5/2002 | Kunimatsu et al. |
| 2002/0097365 A1 | 7/2002 | Yang et al. |
| 2002/0122019 A1 | 9/2002 | Baba et al. |
| 2002/0149546 A1 | 10/2002 | Ben-Chorin et al. |
| 2002/0163526 A1 | 11/2002 | Haseltine et al. |
| 2002/0167528 A1 | 11/2002 | Edge |
| 2002/0186229 A1 | 12/2002 | Brown Elliott |
| 2002/0191130 A1 | 12/2002 | Liang et al. |
| 2003/0085906 A1 | 5/2003 | Elliott et al. |
| 2003/0146891 A1 | 8/2003 | Poliakine |
| 2004/0177323 A1 | 9/2004 | Kaasila et al. |
| 2007/0001994 A1 | 1/2007 | Roth |
| 2008/0024410 A1 | 1/2008 | Ben-David et al. |
| 2008/0030447 A1 | 2/2008 | Ben-David et al. |

FOREIGN PATENT DOCUMENTS

| | | |
|---|---|---|
| EP | 0 653 879 | 5/1995 |
| EP | 1 087 341 | 3/2001 |
| GB | 2 139 393 | 11/1984 |
| JP | 59-159131 | 9/1984 |
| JP | 60-263122 | 12/1985 |
| JP | 62-222774 | 9/1987 |
| JP | 02-173783 | 7/1990 |
| JP | 03-043698 | 4/1991 |
| JP | 03-092888 | 4/1991 |
| JP | H07-043658 | 2/1995 |
| JP | 08-248410 | 9/1996 |
| JP | 08-280038 | 10/1996 |
| JP | 09-230301 | 9/1997 |
| JP | 09-251160 | 9/1997 |
| JP | H10 91083 | 4/1998 |
| JP | 10-307205 | 11/1998 |
| JP | 11-052327 | 2/1999 |
| JP | 2000-116789 | 4/2000 |
| JP | 2000-171799 | 6/2000 |
| JP | 2000-253263 | 9/2000 |
| JP | 2000-321993 | 11/2000 |
| JP | 2000-338950 | 12/2000 |
| JP | 2000-347324 | 12/2000 |
| JP | 2001-1 2366 | 5/2001 |
| JP | 2001-209047 | 8/2001 |
| JP | 2001-306023 | 11/2001 |
| JP | 2002-091369 | 3/2002 |
| JP | 2002-318564 | 10/2002 |
| WO | WO 95/10160 | 4/1995 |
| WO | WO 97/35424 | 9/1997 |
| WO | WO 97/40621 | 10/1997 |
| WO | WO 97/42770 | 11/1997 |
| WO | WO 00/45368 | 8/2000 |
| WO | WO 01/95544 | 12/2001 |
| WO | WO 02/11112 | 2/2002 |
| WO | WO 02/50763 | 6/2002 |
| WO | WO 02/091299 | 11/2002 |
| WO | WO 02/091348 | 11/2002 |
| WO | WO 02/091349 | 11/2002 |
| WO | WO 02/099557 | 12/2002 |
| WO | WO 02/101644 | 12/2002 |
| WO | WO 03/058587 | 7/2003 |

OTHER PUBLICATIONS

U.S. Appl. No. 60/318,626, dated Sep. 13, 2001, Ben David.
Ajito et al., "Expanded Color Gamut Reproduced by Six-Primary Projection Display", Proc. SPIE, vol. 2954 (2000), pp. 130-37.
Ajito et al., "Multiprimary Color Display for Liquid Crystal Display Projectors Using Diffraction Granting", Optical Eng. 38(11) 1883-1888 (Nov. 1999).
Ajito et al., "Color Conversion Method for Multiprimary Display Using Matrix Switching", Optical Review, vol. 9, No. 3 (Dec. 2001), pp. 191-197.
Betrisey et al., "20.4: Displaced Filtering for Patterned Displays", Microsoft Corporation, Society for Information Display, 2000, SID, pp. 1-4.
Credelle et al., "9-2: MTF of High-Resolution Pen Tile Matrix Displays", Eurodisplay 2002, pp. 159-162.
Daly, Scott, "47.3: Analysis of Subtriad Addressing Algorithms by Visual System Models" Center for Displayed Appearance, Sharp Laboratories of America, Camas, WA, USA, 2001, SID, pp. 1200-1203.
Elliott et al., "13.3: Co-Optimization of Color AMLCD Subpixel Architecture and Rendering Algorithms", ClairVoyante Laboratories, USA and AMLCD, Semiconductor Business, Korea, pp. 1-4.
Sugiura, T., "11.4: Invited Paper: EBU Color Filter for LCDs", Toppan Printing Co., Japan, SID, 2001, pp. 146-149.
Elliott, C., "Active Matrix Display Layout Optimization for Subpixel Image Rendering", ClairVoyante Laboratories, USA, pp. 1-5.
Francisco H. Imai, Color Science; "Spectral Reproduction from Scene to Hardcopy", Part 1-Multi-spectral Acquisition and Spectral Estimation using a Trichromatic Digital Camera System Associated with Absorption Filters.
Gunter Wyszecki and W.S. Stiles, Color Science: Concepts and Methods, Quantative Data and Formulae, 2d Ed., 1982, pp. 179-183.
Horibe et al., "High Efficiency and High Visual Quality LCD Backlighting System", Faculty of Science and Technology, Kelo University, Japan, pp. 1-4.
Jeffrey A. Shimizu "40.1: *Invited Paper*: Scrolling Color LCOS for HDTV Rear Projection" SID Symposium Digest of Technical Papers, vol. 32, Issue 1, pp. 1072-1075, Jun. 2001.
Keith Jack, Video Demystified:, 3rd Edition, LLH Technology Publishing, 2001, pp. 215-219.
Ken-Ichi Takatori et al., "Field-Sequential Smectic LCD with TFT Pixel Amplifier ", Functional Devices Research Labs , NEC Corp, Kawasaki, Kanagawa 216-8555, Japan, SID 01 Digest.
Klompenhouwer et al., "13.4: Subpixel Image Scaling for Color Matrix Displays", Phillips Research Laboratories, Einhoven, The Netherlands, 2002, SID, pp. 176-179.
Mashairo Yamaguchi et al."Color Image Reproduction Based on the Multispectral and Multiprimary Imaging: Experimental Evaluation", Device Independent Color, Color Hardcopy and Applications VII, Proc SPIE, vol. 4663, pp. 15-26 (2002).
"Parameter Values for the HDTV Standards for Production and International Programme Exchange", Rec. ITU-R BT.709-3, (1990-1994-1995-1998), pp. 1-28.
Platt, J., "Optimal Filtering for Patterned Displays", Microsoft Research, pp. 1-4.
Hiyama et al., "LN-3: Four-Primary Color 15-in. XGA TFT-LCD with Wide Color Gamut", Japan, Eurodisplay 2002, pp. 827-830.
Sugiura et al., "P-24: LCD Module Adopting a Color Conversion Circuit", Japan, SID, 2002, pp. 288-291.
Rosen et al., "Spectral Reproduction from Scene to Hardcopy II", Image Processing. Munsell Color Science Laboratory, RIT-Proceedings of SPIE vol. 4300 (2001).
Pointer, M. R., "The Gamut of Real Surface Colors", Color Research & Appl. 5(3): 145-155, 1980.
Wyble et al. "A critical view of Spectral Models Applied to Binary Color Printing", Color Research and Application, vol. 25, 2000 pp. 4-19.
Yamada et al., "12.1: LED Backlight for LCDs", IBM Research, Tokyo Research Laboratory, Yamato, Japan, 1998, SID, pp. 1-4.
Notice of Allowance issued by the United States Patent and Trademark Office for U.S. Appl. No. 10/480,280, dated Jun. 19, 2007.
Notice of Allowance issued by the United States Patent and Trademark Office for U.S. Appl. No. 11/882,491, dated Dec. 3, 2010.
Notice of Allowance issued by the United States Patent and Trademark Office for U.S. Appl. No. 11/882,491, dated Mar. 31, 2011.
Office Action issued by the United States Patent and Trademark Office for U.S. Appl. No. 11/882,170, dated Aug. 3, 2010.

(56) References Cited

OTHER PUBLICATIONS

Notice of Allowance issued by the United States Patent and Trademark Office for U.S. Appl. No. 11/882,170, dated Dec. 22, 2010.
Notice of Allowance issued by the United States Patent and Trademark Office for U.S. Appl. No. 11/882,170, dated Mar. 18, 2011.
Office Action issued by the United States Patent and Trademark Office for U.S. Appl. No. 12/103,269, dated Jul. 17, 2009.
Office Action issued by the United States Patent and Trademark Office for U.S. Appl. No. 12/103,269, dated Jan. 6, 2010.
Notice of Allowance issued by the United States Patent and Trademark Office for U.S. Appl. No. 12/103,269, dated Jul. 8, 2010.
Office Action issued by the United States Patent and Trademark Office for U.S. Appl. No. 13/194,510, dated Dec. 23, 2011.
Notice of Allowance issued by the United States Patent and Trademark Office for U.S. Appl. No. 13/194,510, dated May 21, 2012.
Search report from Application No. PCT/IL02/00452, dated Dec. 9, 2002.
Summons to Attend oral Proceedings for Application No. 10185118.6, dated Apr. 17, 2015.
International Search Report from Application No. PCT/IL03/00020, dated Jul. 2, 2003.
Search Report from PCT/IL03/00307, dated Sep. 11, 2003.
Supplementary European Search Report for EP 03715317.8 dated Feb. 11, 2009.
Supplemental Search Report for EP 02 73 3203, dated Oct. 5, 2005.
European Search Report for EP 04 01 1262, dated Oct. 25, 2005.
Supplementary European Search Report of Application No. 03715317 dated Jan. 29, 2009.
Chinese Office Action of Application No. 02815277.8 dated Oct. 27, 2006.
Indian Office Action for Application No. 1975/CHENP/2003, dated Jul. 23, 2007.
Notice of Allowance for U.S. Appl. No. 13/589,698, dated Jun. 4, 2013.
U.S. Office Action for U.S. Appl. No. 13/589,698, dated Feb. 15, 2013.
Notice of Allowance for U.S. Appl. No. 12/103,269, dated Jul. 8, 2014.
Chinese Office Action for Application No. 02815277.8, dated Aug. 3, 2007.
Chinese Office Action for Application No. 02815277.8, dated Nov. 9, 2007.
Chinese Notice of Allowance for Application No. 02815277.8, dated Apr. 25, 2008.
European Office Action for Application No. 02733203, dated Oct. 17, 2006.
European Office Action for Application No. 02733203, dated Apr. 5, 2006.
Extended European Search Report for Application No. 10185116, dated Jan. 24, 2012.
Extended European Search Report for Application No. 10185118.6, dated Jan. 20, 2012.
Office Action for European Application No. 10185118.6, dated Oct. 8, 2013.
Israeli Office Action from Application No. 159246, dated Mar. 12, 2008.
Israeli Office Action from Application No. 159246, dated Oct. 6, 2008.
Notice of Allowance for Indian Application No. 1975/CHENP/2003, dated May 30, 2008.
Office Action for Indian Application No. 2233/CHENP/2008, dated Nov. 13, 2013.
Japanese Office Action for Application No. 2003-504324, dated May 19, 2006.
Japanese Office Action for Application No. 2003-504324, dated Mar. 22, 2007.
Japanese Notice of Allowance for Application No. 2003-504324, dated Aug. 10, 2008.
Japanese Office Action for Application No. 2006-312481, dated Jun. 7, 2011.
Japanese Office Action for Application No. 2008-112429, dated Jun. 19, 2012.
Japanese Notice of Allowance for Application No. 2006-312481, dated Apr. 2, 2013.
Japanese Office Action for Application No. 2008-112429, dated May 31, 2011.
Japanese Office Action for Application No. 2008-112429, dated Jun. 19, 2012.
Japanese Notice of Allowance for Application No. 2008-112429, dated Apr. 2, 2013.
Japanese Office Action for Application No. 2011-258746, dated Jun. 11, 2013.
Japanese Office Action for Application No. 2011-258746, dated Apr. 1, 2014.
Japanese Notice of Allowance for Application No. 2011-258746, dated Aug. 19, 2014.

\* cited by examiner

Fig. 8

| R | G | Y | B | R | G | Y | B |
|---|---|---|---|---|---|---|---|
| R | G | Y | B | R | G | Y | B |

Fig. 9

COLOR DISPLAY DEVICE COMPRISING AT LEAST SIX DIFFERENT PRIMARY COLORS

CROSS-REFERENCE TO RELATED APPLICATIONS

This application is a continuation application of U.S. patent application Ser. No. 12/103,269, filed Apr. 15, 2008, which is a divisional application of U.S. patent application Ser. No. 11/882,491, filed Aug. 2, 2007, now U.S. Pat. No. 7,995,019, which is a continuation application of U.S. patent application Ser. No. 10/480,280, filed Dec. 11, 2003, now U.S. Pat. No. 7,268,757, which is a National Phase Application of PCT International Application No. PCT/IL02/00452, International Filing Date Jun. 11, 2002, claiming priority of U.S. Provisional Patent Application No. 60/296,767, filed Jun. 11, 2001, U.S. Provisional Patent Application No. 60/318,626, filed Sep. 13, 2001, and U.S. Provisional Patent Application No. 60/371,419, filed Apr. 11, 2002, all of which are incorporated herein by reference in their entirety.

FIELD OF THE INVENTION

The invention relates generally to color display devices, systems and methods and, more particularly, to display devices, systems and methods having improved color image reproduction capability.

BACKGROUND OF THE INVENTION

Standard computer monitors and TV displays are typically based on reproduction of three, additive, primary colors ("primaries"), for example, red, green, and blue, collectively referred to as RGB. Unfortunately, these monitors cannot display many colors perceived by humans, since they are limited in the range of color they are capable of displaying. FIG. 1A schematically illustrates a chromaticity diagram as is known in the art. The closed area in the shape of a horseshoe represents the chromaticity range of colors that can be seen by humans. However, chromaticity alone does not fully represent all visible color variations. For example, each chromaticity value on the two-dimensional chromaticity plane of FIG. 1A may be reproduced at various different brightness levels. Thus, a full representation of the visible color space requires a three dimensional space including, for example, two coordinates representing chromaticity and a third coordinate representing brightness. Other three dimensional space representations may also be defined. The points at the border of the horseshoe diagram in FIG. 1A, commonly referred to as "spectrum locus", correspond to monochromatic excitations at wavelengths ranging, for example, from 400 nm to 780 nm. The straight line "closing" the bottom of the horseshoe, between the extreme monochromatic excitation at the longest and shortest wavelengths, is commonly referred to as "the purple line". The range of colors discernible by the human eye, represented by the area of the horseshoe diagram above the purple line, at varying brightness levels, is commonly referred to as the color gamut of the eye. The dotted triangular area of FIG. 1A represents the range of colors that are reproducible by a standard RGB monitor.

There are many known types of RGB monitors, using various display technologies, including but not limited to CRT, LED, plasma, projection displays, LCD devices and others. Over the past few years, the use of color LCD devices has been increasing steadily. A typical color LCD device is schematically illustrated in FIG. 2A. Such a device includes a light source 202, an array of liquid crystal (LC) elements (cells) 204, for example, an LC array using Thin Film Transistor (TFT) active-matrix technology, as is known in the art. The device further includes electronic circuits 210 for driving the LC array cells, e.g., by active-matrix addressing as is known in the art, and a tri-color filter array, e.g., a RGB filter array 206, juxtaposed the LC array. In existing LCD devices, each full-color pixel of the displayed image is reproduced by three sub-pixels, each sub-pixel corresponding to a different primary color, e.g., each pixel is reproduced by driving a respective set of R, G and B sub-pixels. For each sub-pixel there is a corresponding cell in the LC array. Back-illumination source 202 provides the light needed to produce the color images. The transmittance of each of the sub-pixels is controlled by the voltage applied to the corresponding LC cell, based an the RGB data input for the corresponding pixel. A controller 208 receives the input RGB data, scales it to the required size and resolution, and adjusts the magnitude of the signal delivered to the different drivers based on the input data for each pixel. The intensity of white light provided by the back-illumination source is spatially modulated by the LC array, selectively attenuating the light for each sub pixel according to the desired intensity of the sub-pixel. The selectively attenuated light passes through the RGB color filter array, wherein each LC cell is in registry with a corresponding color sub-pixel, producing the desired color sub-pixel combinations. The human vision system spatially integrates the light filtered through the different color sub-pixels to perceive a color image.

U.S. Pat. No. 4,800,375 ("the '375 patent"), the disclosure of which is incorporated herein by reference in its entirety, describes an LCD device including an array of LC elements juxtaposed in registry with an ray of color filters. The filter array includes the three primary color sub-pixel filters, e.g., RGB color filters, which are interlaced with a fourth type of color filter to form predetermined repetitive sequences. The various repetitive pixel arrangements described by the '375 patent, e.g., repetitive 16-pixel sequences, are intended to simplify pixel arrangement and to improve the ability of the display device to reproduce certain image patterns, e.g., more symmetrical line patterns. Other than controlling the geometric arrangement of pixels, the '375 patent does not describe or suggest any visual interaction between the three primary colors and the fourth color in the repetitive sequences.

LCDs are used in various applications. LCDs are particularly common in portable devices, for example, the small size displays of PDA devices, game consoles and mobile telephones, and the medium size displays of laptop ("notebook") computers. These applications require thin and miniaturized designs and low power consumption. However, LCD technology is also used in non-portable devices, generally requiring larger display sizes, for example, desktop computer displays and TV sets. Different LCD applications may require different LCD designs to achieve optimal results. The more "traditional" markets for LCD devices, e.g., the markets of battery-operated devices (e.g., PDA, cellular phones and laptop computers) require LCDs with high brightness efficiency, which leads to reduced power consumption. In desktop computer displays, high resolution, image quality and color richness are the primary considerations, and low power consumption is only a secondary consideration. Laptop computer displays require both high resolution and low power consumption; however, picture quality and color richness are compromised in many such devices. In TV display applications, picture quality and color richness are generally the most important considerations; power consumption and high resolution are secondary considerations in such devices.

Typically, the light source providing beck-illumination to LCD devices is a Cold Cathode Fluorescent Light (CCFL). FIG. 3 schematically illustrates typical spectra of a CCFL, as is known in the art. As illustrated in FIG. 3, the light source spectra include three, relatively narrow, dominant wavelength ranges, corresponding to red, green and blue light, respectively. Other suitable light sources, as are known in the art, may alternatively be used. The RGB filters in the filter sub-pixel array are typically designed to reproduce a sufficiently wide color gamut (e.g., as close as possible to the color gamut of a corresponding CRT monitor), but also to maximize the display efficiency, e.g., by selecting filters whose transmission curves generally overlap the CCFL spectra peaks in FIG. 3. In general, for a given source brightness, filters with narrower transmission spectra provide a wider color gamut but a reduced display brightness, and vice versa. For example, in applications where power efficiency is a critical consideration, color gamut width may often be sacrificed. In certain TV applications, brightness is an important consideration; however, dull colors are not acceptable.

FIG. 4A schematically illustrates typical RGB filter spectra of existing laptop computer displays. FIG. 4B schematically illustrates a chromaticity diagram representing the reproducible color gamut of the typical laptop spectra (dashed-triangular area in FIG. 4B), as compared with an ideal NTSC color gamut (dotted triangular area in FIG. 4B). As shown in FIG. 4B, the NTSC color gamut is significantly wider than the color gamut of the typical laptop computer display and therefore, many color combinations included in the NTSC gamut are not reproducible by the typical color laptop computer display.

SUMMARY OF THE INVENTION

Many colors seen by humans are not discernible on standard red-green-blue (RGB) monitors. By using a display device with more than three primary colors, the reproducible color gamut of the display is expanded. Additionally or alternatively, the brightness level produced by the display may be significantly increased. Embodiments of the present invention provide systems and methods of displaying color images on a display device, for example, a thin profile display device, such as a liquid crystal display (LCD) device, using more than three primary colors.

An aspect of the invention provides improved multi-primary display devices using more than three sub-pixels of different colors to create each pixel. In embodiments of this aspect of the invention, the use of four to six (or more) different color sub-pixels, per pixel, allows for a wider color gamut and higher luminous efficiency. In some embodiments the number of sub-pixels per pixel and the color spectra of the different sub-pixels may be optimized to obtain a desired combination of a sufficiently wide color gamut, sufficiently high brightness, and sufficiently high contrast.

In some embodiments of the invention, the use of more than three primary colors may expand the reproducible color gamut of the display by enabling the use of relatively narrow wavelength ranges for some of the primary colors, e.g., red, green and blue, thus increasing the saturation of those primary colors. To compensate for a potentially reduced brightness level from such narrower ranges, in some embodiments of the invention, broad wavelength range primary colors, e.g., specifically designed yellow and/or cyan, may be used in addition to the narrow wavelength range colors, thus increasing the overall brightness of the display. In further embodiments of the invention, additional primary colors (e.g., magenta) and/or different primary color spectra may be used to improve various other aspects of the displayed image. In accordance with embodiments of the invention, an optimal combination of color gamut width and over-all display brightness can be achieved, to meet the requirements of a given system, by designing specific primary colors and sub-pixel arrangements.

The color gamut and other attributes of a more-than-three primary color LCD device in accordance with embodiments of the invention may be controlled by controlling the spectral transmission characteristics of the different primary color sub-pixel filter elements used by the device. According to an aspect the invention, four or more different primary color sub-pixel filters are used, to produce four or more, respective, primary colors, for example, RGB and yellow (Y). In further embodiments of the invention, at least five different primary color sub-pixel filters are used, for example, RB, Y and cyan (C) filters. In additional embodiments of the invention, at least six different primary color sub-pixel filters are used, for example, RGB, Y, C and magenta (M) filters.

The primary color sub-pixel filters for a more-than-three primary color LCD device in accordance with the invention may be selected in accordance with various criteria, for example, to establish sufficient coverage of a desired color gamut, to maximize the brightness level that can be produced by the display, and/or to adjust the relative intensities of the primary colors according to a desired chromaticity standard.

Further embodiments of the invention provide sequential color display devices, systems and methods, for example, sequential color LCD devices, using more than three primary colors. In such devices, color images are produced by sequentially beck-illuminating an array of Liquid Crystal (LC) cells with light of four or more, pre-selected, primary colors, producing a periodic sequence of four or more, respective, primary color images, which are temporally integrated into a full color image by a viewer's vision system. In some embodiments, sequential back-illumination with four or more primary colors is produced by sequentially filtering light through four or more, respective, color filters. In other embodiments, a multi-color light source, for example, a plurality of light emitting diodes (LEDs) capable of separately producing any of the four or more primary colors, is activated to sequentially produce the different primary color back-illumination.

In accordance with embodiments of an aspect of the invention, there is thus provided a color Liquid Crystal Display (LCD) device for displaying a color image using at least four different primary colors, the device including an array of Liquid Crystal (LC) elements, driving circuitry adapted to receive an input corresponding to the color image and to selectively activate the LC elements of the LC array to produce an attenuation pattern corresponding to a gray-level representation of the color image, and an array of color sub-pixel filter elements juxtaposed and in registry with the array of LC elements such that each color sub-pixel filter element is in registry with one of the LC elements, wherein the array of color sub-pixel filter elements includes at least four types of color sub-pixel filter elements, which transmit light of the at least four primary colors, respectively.

In accordance with embodiments of another aspect of the invention, there is provided a color Liquid Crystal Display (LCD) device for displaying a temporally-integrated color image including a sequence of at least four primary color images, the device including an array of Liquid Crystal (LC) elements, driving circuitry adapted to receive an input corresponding to each of the at least four primary color images and to selectively activate the LC elements of the LC array to produce an attenuation pattern corresponding to a gray-level representation of each of the at least four primary color images, respectively, and an illumination system adapted to sequentially back-illuminate the LC array with light of at least four different primary colors to sequentially produce the at least four, respective, primary color images, wherein the driving circuitry and the illumination system are synchronized such that each the attenuation pattern is illuminated with light of the primary color corresponding to the respective primary color image.

In some embodiments of this aspect of the invention, the illumination system includes a light source having an output path, a filter switching mechanism which sequentially interposes at least four different primary color filters in the output path of the light source to produce the light of at least four different primary colors, respectively, and an optical arrangement which guides the light of at least four different primary colors from the filter switching mechanism to the LC array thereby to back-illuminate the LC array. In other embodiments of this aspect of the invention, the illumination system includes an array of Light Emitting Diodes (LEDs), illumination control circuitry adapted to selectively activate the plurality of LEDs to produce a sequence of at least four illumination patterns corresponding to the light of at least four different primary colors, respectively, and an optical arrangement which causes the at least four illumination patterns produced by the array of LEDs to back-illuminate the LC array with a generally spatially homogeneous light of the at least four, respective, primary colors.

In accordance with embodiments of a further aspect of the invention, there is provided a color display device for displaying an n-primary image, wherein n is greater than three, having an array of color sub-pixel elements including sub-pixel elements of each of at least four different primary colors arranged in an array of periodically repetitive super-pixel structures covering substantially the entire n-primary image, each super-pixel structure including a predetermined, fixed, number of n-primary pixels, each n-primary pixel including one color sub-pixel element of each of the at least four different primary colors, wherein no fixed combination of n-primary pixels covering only part of the super-pixel structure can be periodically repeated to cover substantially the entire n-primary image.

In some embodiments of this aspect of the invention, the at least four primary colors include at least five primary colors, and the super pixel structure includes a substantially rectangular arrangement including five sequences of four sub-pixel elements, each sequence including a different combination of sub-pixel elements of four of the five primary colors. In other embodiments of this aspect of the invention, the at least four primary colors include at least six primary colors, and the super pixel structure includes a substantially rectangular arrangement including three sequences of four sub-pixel elements, each sequence including a different combination of sub-pixel elements of four of the six primary colors.

In accordance with embodiments of an additional aspect of the invention, there is provided a method of displaying an n-primary color image, wherein n is greater than three, on an n-primary color display having an array of color sub-pixel elements including sub-pixel elements of each of at least four different primary colors arranged in an array of periodically repetitive super-pixel structures covering substantially the entire n-primary image, each super-pixel structure including a predetermined, fixed, number of n-primary pixels, each n-primary pixel including one color sub-pixel element of each of the at least four different primary colors, wherein no fixed combination of n-primary pixels covering only part of the super-pixel structure can be periodically repeated to cover substantially the entire n-primary image, the method including receiving an input representing three-component color image data, e.g., RGB or YCC data, including a plurality of three-component pixels and having a first resolution, scaling the three-component color image data to produce scaled three-component color image data having a second resolution different from the first resolution, converting the scaled three-component color image data into corresponding n-primary color pixel data representing the n-primary color image, and generating an n-primary input signal corresponding to the n-primary color pixel data.

In some embodiments of this aspect of the invention, the method includes, before generating the n-primary input signal, collecting the n-primary color pixel data of all n-primary pixels of each super-pixel, and distributing the collected data representing each super-pixel structure into a plurality of sub-pixel data segments, each segment representing one sub-pixel of each the super-pixel, wherein generating the n-primary input signal includes generating a gray-level value for each of the sub-pixels.

In accordance with embodiments of yet another aspect of the invention, there is provided a method of displaying an n-primary image, wherein n is greater than or equal to six, on an n-primary display having an array of color sub-pixel elements including color sub-pixel elements of each of at least six different primary colors, including at least a first set of primary colors and a second set of primary colors, arranged in a periodically repeating arrangement including at least one color sub-pixel element of each of the at least six different primary colors, the method including receiving an image input representing image data including a plurality of pixels, each pixel including one sub-pixel of each of the first set of primary colors, separating the image data into a first image component, including a first group of the pixels, and a second image component, including a second group of the pixels, wherein each pixel in the first group is substantially adjacent to a respective pixel in the second group, converting the pixels in the second group into corresponding, converted pixels, each pixel including one sub-pixel of each of the second set of primary colors, and generating an n-primary input signal representing data corresponding to each of the converted color pixels in the second group and the respective, substantially adjacent, pixel in the first group.

In some embodiments of this aspect of the invention, the method includes, before generating the n-primary input signal, combining each of the converted pixels in the second group with the respective, substantially adjacent, pixel of the first group, to produce a corresponding n-primary pixel including one sub-pixel of each of the at least six primary colors, wherein generating the n-primary input signal includes generating a signal representing data corresponding to each the n-primary pixel.

Further, in some embodiments of this aspect of the invention, the image input includes a color image input representing three-component color image data, e.g., RGB or YCC data, wherein the at least first and second sets of primary colors include first and second sets of three primary colors, and wherein each color pixel of the n-primary image is reproduced by either the first or second set of three primary colors. In other embodiments of this aspect of the invention, the image input includes a black-and-white image input representing black-and-white image data including a plurality of black-and-white pixels. The at least first and second sets of primary colors may include first and second sets of three, complementary, primary colors, and each black-and-white pixel of the n-primary image may be produced by either the first or second set of primary colors. Alternatively, the at least first and second sets of primary colors include first, second and third pairs of complementary primary colors, and each black-and-white pixel of the n-primary image is produced by one of the first, second and third pairs of primary colors.

In accordance with embodiments of a still further aspect of the invention, there is provided a color display device for displaying an n-primary image, wherein n is greater than or equal to six, having an array of color sub-pixel elements including color sub-pixel elements of each of at least six different primary colors, including at least a first set of primary colors and a second set of primary colors, arranged in a periodically repeating arrangement including at least one color sub-pixel element of each of the at least six different primary colors, wherein each sub-pixel in the periodically repeating arrangement is adjacent at least one sub-pixel of a complementary primary color.

In some embodiments of this aspect of the invention, the periodically repeating arrangement includes a first sequence of sub-pixel elements of each of the first set of primary colors and a second sequence of sub-pixel elements of each of the second set of primary colors, wherein each sub-pixel element in the first sequence is adjacent a sub-pixel element of a complementary primary color in the second sequence.

In accordance with embodiments of yet an additional aspect of the invention, there is provided a system for displaying an n-primary color image, wherein n is greater than three, including an n-primary color display device having an array of color sub-pixel elements including sub-pixel elements of each of at least four different primary colors arranged in an array of periodically repetitive super-pixel structures covering substantially the entire n-primary image, each super-pixel structure including a predetermined, fixed, number of n-primary pixels, each n-primary pixel including one color sub-pixel element of each of the at least four different primary colors, wherein no fixed combination of n-primary pixels covering only part of the super-pixel structure can be periodically repeated to cover substantially the entire n-primary image, means for receiving an input representing three-component color image data, e.g., RGB or YCC data, including a plurality of three-component pixels and having a first resolution, a scaling unit, which scales the threo-component color image data to produce scaled three-component color image data having a second resolution different from the first resolution, a converter which converts the scaled three-component color image data into corresponding n-primary color pixel data representing the n-primary color image, and means for generating an n-primary input signal corresponding to the n-primary color pixel data.

In some embodiments of this aspect of the invention, the system further includes a collection unit, which collects the n-primary color pixel data of all n-primary pixels of each super-pixel, and a distribution unit, which distributes the collected data representing each super-pixel structure into a plurality of sub-pixel data segments, each segment representing one sub-pixel of each the super-pixel, wherein the means for generating the n-primary input signal generates a gray-level value for each of the sub-pixels.

In accordance with embodiments of still another aspect of the invention, there is provided a system for displaying an n-primary image, wherein n is greater than or equal to six, including an n-primary display device having an array of color sub-pixel elements including color sub-pixel elements of each of at least six different primary colors, including at least a first set of primary colors and a second set of primary colors, arranged in a periodically repeating arrangement including at least one color sub-pixel element of each of the at least six different primary colors, an image collector which receives an image input representing image data including a plurality of pixels, each pixel including one sub-pixel of each of the first set of primary colors, means for separating the color image data into a first image component, including a first group of the pixels, and a second image component, including a second group of the pixels, wherein each pixel in the first group is substantially adjacent to a respective pixel in the second group, means for converting the pixels in the second group into corresponding, converted pixels, each pixel including one sub-pixel of each of the second set of primary colors, and means for generating an n-primary input signal representing data corresponding to each of the converted color pixels in the second group and the respective, substantially adjacent, pixel in the first group.

In some embodiments of this aspect of the invention, the system further includes a pixel combiner which combines each of the converted color pixels in the second group with the respective, substantially adjacent, pixel of the first group, to produce a corresponding n-primary pixel including one sub-pixel of each of the at least six primary colors, wherein the means for generating the n-primary input signal generates a signal representing data corresponding to each the n-primary pixel.

In embodiments of the present invention, the wavelength ranges of the at least four primary colors or, in some embodiments the at least five or six primary colors, are selected to provide an optimal over-all brightness of the displayed images. Additionally or alternatively, the wavelength ranges of the at least four primary colors are selected to provide an optimal color gamut width of the displayed images.

In accordance with embodiments of yet another aspect of the invention, there is provided a color display device for displaying an n-primary image, wherein n is greater than three, having an array of color sub-pixel elements including sub-pixel elements of each of at least four different primary colors arranged in an array of periodically repetitive super-pixel structures covering substantially the entire n-primary image, each super-pixel structure including a predetermined, fixed, number of n-primary pixels, each n-primary pixel including one color sub-pixel element of each of the at least four different primary colors, wherein the sub-pixel elements in each super-pixel structure are arranged in a rectangular sub-array having an average aspect ratio sufficiently close to one.

BRIEF DESCRIPTION OF THE DRAWING

The invention will be understood and appreciated more fully from the following detailed description of embodiments of the invention, taken in conjunction with the accompanying drawings in which:

FIG. 8 is a schematic illustration of an exemplary arrangement of sub-pixels in a four-primary display device according to embodiments of the invention;

FIG. 9 is a schematic illustration of an exemplary arrangement of sub-pixels, including a super-pixel structure, in a five-primary display device according to embodiments of the invention;

DETAILED DESCRIPTION OF EMBODIMENTS OF THE INVENTION

In the following description, various aspects of the invention are described, with reference to specific embodiments that provide a thorough understanding of the invention; however, it will be apparent to one skilled in the art that the present invention is not limited to the specific embodiments and examples described herein. Further, to the extent that certain details of the devices, systems and methods described herein are related to known aspects of color display devices, systems and methods, such details may have been omitted or simplified for clarity.

Figure 1A:
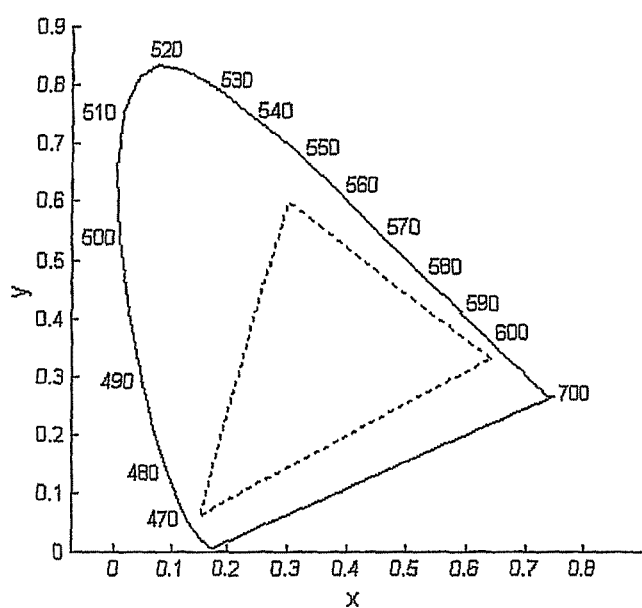
FIG. 1A is a schematic illustration of a chromaticity diagram representing a prior art RGB color gamut, superimposed with a chromaticity diagram of the color gamut of a human vision system, as is known in the art.
Figure 1B:
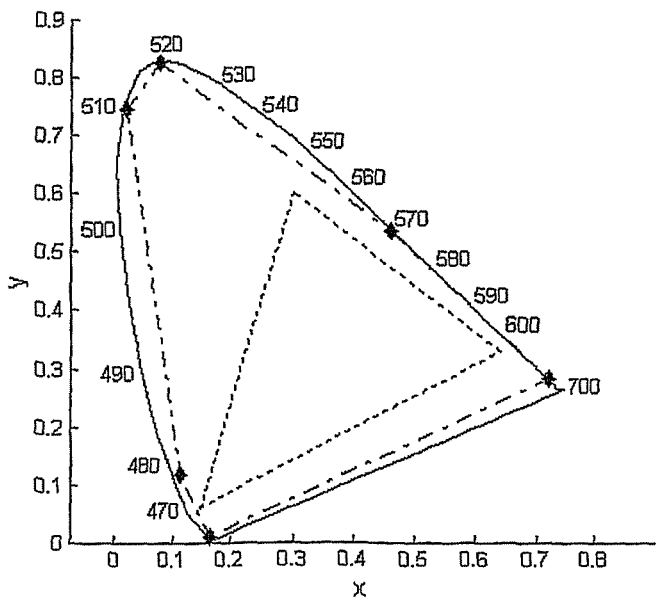
FIG. 1B is a schematic illustration of a chromaticity diagram representing a wide color gamut in accordance with an exemplary embodiment of the invention, superimposed with the chromaticity diagram of FIG. 1A.

FIG. 1B schematically illustrates a color gamut of a more-than-three-primary display in accordance with an embodiment of the invention, enclosed by a horseshoe diagram representing the perceivable color gamut of the human eye, on a chromaticity plane. The six-sided shape in FIG. 1B represents the color gamut of a six-primary display in accordance with an exemplary embodiment of the invention. This color gamut is significantly wider than a typical RGB color gamut, which is represented by the dotted triangular shape in FIG. 1B. Embodiments of monitors and display devices with more than three primaries, in accordance with exemplary embodiments of the invention, are described in U.S. patent application Ser. No. 09/710,895, entitled "Device, System And Method For Electronic True Color Display", filed Nov. 14, 2000, in International Application PCT/IL01/00527, filed Jun. 7, 2001, entitled "Device, System and Method For Electronic True Color Display" and published Dec. 13, 2001 as PCT Publication WO 01/95544, in U.S. patent application Ser. No. 10/017,546, filed Dec. 18, 2001, entitled "Spectrally Matched Digital Print Proofer", and in International Application PCT/IL02/00410, filed May 23, 2002, entitled "System and method of data conversion for wide gamut displays", the disclosures of all of which applications and publications are incorporated herein by reference.

While, in embodiments of the present invention, methods and systems disclosed in the above referenced patent applications may be used, for example, methods of converting source data to primary data, or methods of creating primary color materials or filters; in alternate embodiments, the system and method of the present invention may be used with any other suitable n-primary display technology, wherein n is greater than three. Certain embodiments described in these applications are based on rear or front projection devices, CRT devices, or other types of display devices. While the following description focuses mainly on n-primaries flat panel display devices in accordance with exemplary embodiments of the invention, wherein n is greater than three, preferably using LCDs, it should be appreciated that, in alternate embodiments, the systems, methods and devices of the present invention may also be used in conjunction with other types of display and other types of light sources and modulation techniques. For example, it will be appreciated by persons skilled in the art that the principles of the n-primary color display device of the invention may be readily implemented, with appropriate changes, in CRT displays, Plasma display, Light Emitting Diode (LED) displays, Organic LED (OLED) displays and Field Emissions Display (FED) devices, or any hybrid combinations of such display devices, as are known in the art.

Figure 2A:
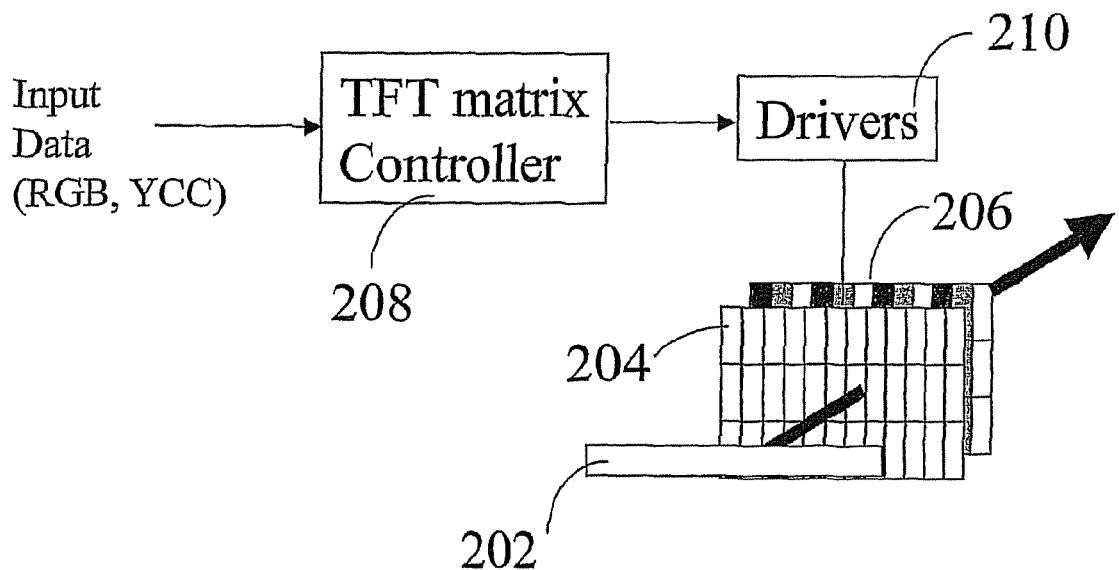
FIG. 2A is a schematic block diagram illustrating a prior art 3-primary LCD system.
Figure 2B:
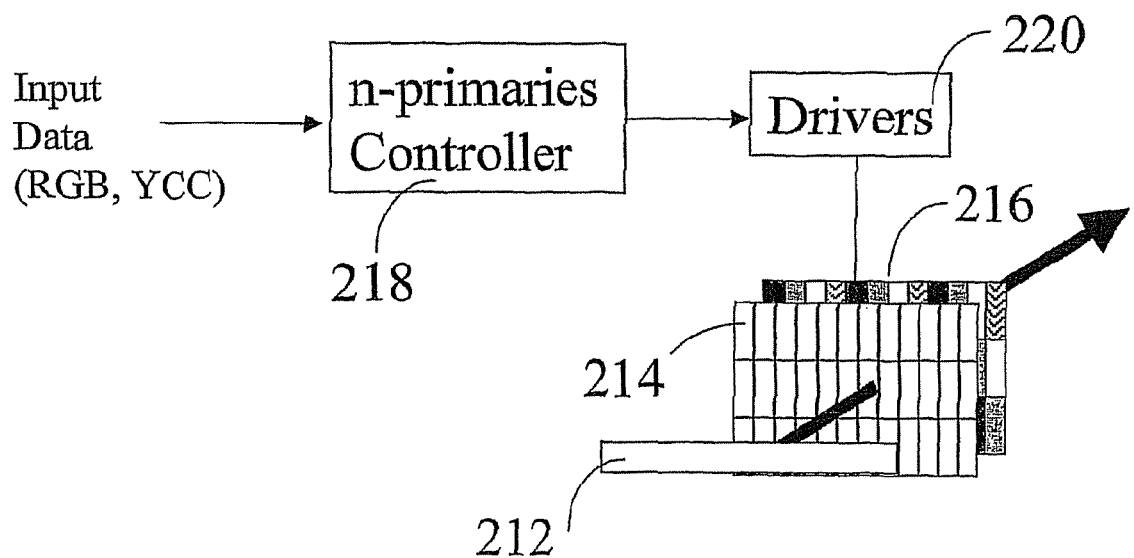
FIG. 2B is a schematic block diagram illustrating an n-primary LCD system in accordance with an embodiment of the invention.
Figure 3:
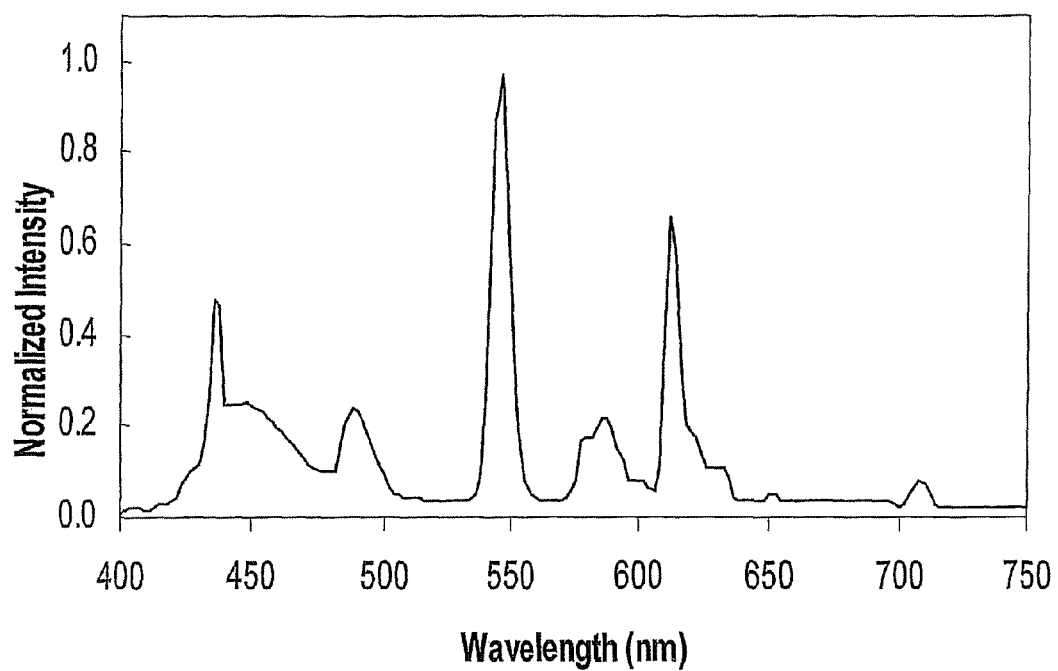
FIG. 3 is a schematic graph illustrating typical spectra of a prior art Cold Cathode Fluorescent Light (CCFL) source.

FIG. 2B schematically illustrates a more-than-three primary color display system in accordance with an embodiment of the invention. The system includes a light source 212, an array of liquid crystal (LC) elements (cells) 214, for example, an LC array using Thin Film Transistor (TFT) active-matrix technology, as is known in the art. The device further includes electronic circuits 220 for driving the LC array cells, e.g., by active-matrix addressing, as is known in the art, and an n-primary-color filter array 216, wherein n is greater than three, juxtaposed the LC array. In embodiments of the LCD devices according to embodiments of the invention, each full-color pixel of the displayed image is reproduced by more than three sub-pixels, each sub-pixel corresponding to a different primary color, e.g., each pixel is reproduced by driving a corresponding set of four or more sub-pixels. For each sub-pixel there is a corresponding cell in LC array 214. Back-illumination source 212 provides the light needed to produce the color images. The transmittance of each of the sub-pixels is controlled by the voltage applied to a corresponding LC cell of array 214, based on the image data input for the corresponding pixel. An n-primaries controller 218 receives the input data, e.g., in RGB or YCC format, optionally scales the data to a desired size and resolution, and adjusts the magnitude of the signal delivered to the different drivers based on the input data for each pixel. The intensity of white light provided by back-illumination source 212 is spatially modulated by elements of the LC array, selectively controlling the illumination of each sub-pixel according to the image data for the sub-pixel. The selectively attenuated light of each sub-pixel passes through a corresponding color filter of color filter array 216, thereby producing desired color sub-pixel combinations. The human vision system spatially integrates the light filtered through the different color sub-pixels to perceive a color image.

The color gamut and other attributes of LCD devices in accordance with embodiments of the invention may be controlled by a number of parameters. These parameters include: the spectra of the back illumination element (light source), for example a Cold Cathode Fluorescent Light (CCFL); the spectral transmission of the LC cells in the LC array, and the spectral transmission of the color filters. In a 3-primaries display, the first two parameters, namely, the spectra of the light source and the spectral transmission of the LC cell, are typically dictated by system constraints and, therefore, the colors for the filters may be selected straightforwardly to provide the required colorimetric values at the "corners" of the desired RGB triangle, as shown in FIG. 1A. To maximize the efficiency of 3-primaries LCD devices, the spectral transmissions of the filters are designed to substantially overlap, to the extent possible, with the wavelength peaks of the light source. The filters selection in 3-primary LCD devices may be based primarily on maximizing the overall brightness efficiency. In this context, it should be noted that selecting filters having narrower spectral transmission curves, which result in more saturated primary colors, generally decreases the over-all brightness level of the display.

For a multi-primary display with more than three primary colors, in accordance with embodiments of the invention, an infinite number of filter combinations can be selected to substantially overlap a required color gamut. The filter selection method of the invention may include optimizing the filter selection according to the following requirements: establishing sufficient coverage of a desired two-dimensional color gamut, for example, the NTSC standard gamut for wide-gamut applications and a "conventional" 3-color LCD gamut for higher brightness applications; maximizing the brightness level of a balanced white point that can be obtained from combining all the primary colors; and adjusting the relative intensities of the primary colors in accordance with a desired illumination standard, e.g., the D65 white point chromaticity standard of High Definition TV (HDTV) systems.

Embodiments of the present invention provide systems and methods of displaying color images on a display device, for example, a thin profile display device, such as a liquid crystal display (LCD) device, using more than three primary colors. A number of embodiments of the invention are described herein in the context of an LCD device with more than three primary colors; wherein the number of color filters used per pixel is greater than three. This arrangement has several advantages in comparison to conventional RGB display devices. First, the n-primary display device in accordance with the invention enables expansion of the color gamut covered by the display. Second, the device in accordance with the invention enables a significant increase in the luminous efficiency of the display; in some cases, an increase of about 50 percent or higher may be achieved, as discussed below. This feature of the invention is particularly advantageous for portable (e.g., battery-operated) display devices, because increased luminous efficiency extends the battery life and overall weight of such devices. Third, a device in accordance with the invention enables improved graphics resolution by efficient utilization of a sub-pixel rendering technique of the present invention, as described in detail below with reference to specific embodiments of the invention.

In some multi-primary display devices in accordance with embodiments of the invention, more than three sub-pixels of different colors are used to create each pixel. In embodiments of the invention, the use of four to six (or more) different color sub-pixels, per pixel, allows for a wider color gamut and higher luminous efficiency. In some embodiments, the number of sub-pixels per pixel and the transmittance spectrum of the different sub-pixel filters may be optimized to obtain a desired combination of a sufficiently wide color gamut, sufficiently high brightness, and sufficiently high contrast.

For example, the use of more than three primaries in accordance with an embodiment of the invention may enable expansion of the reproducible color gamut by enabling the use of filters with narrower transmission curves (e.g., narrower effective transmission ranges) for the R, G and B color filters and, thus, increasing the saturation of the R, G and B sub-pixels. To compensate for such narrower ranges, in some embodiments of the invention, broader band sub-pixel filters may be used in addition to the RGB saturated colors, thus increasing the overall brightness of the display. In accordance with embodiments of the invention, an optimal combination of color gamut width and over-all picture brightness can be achieved, to meet the requirements of a given system, by appropriately designing the sub-pixel filters of the n-primary display and the filter arrangement.

Figure 5A:
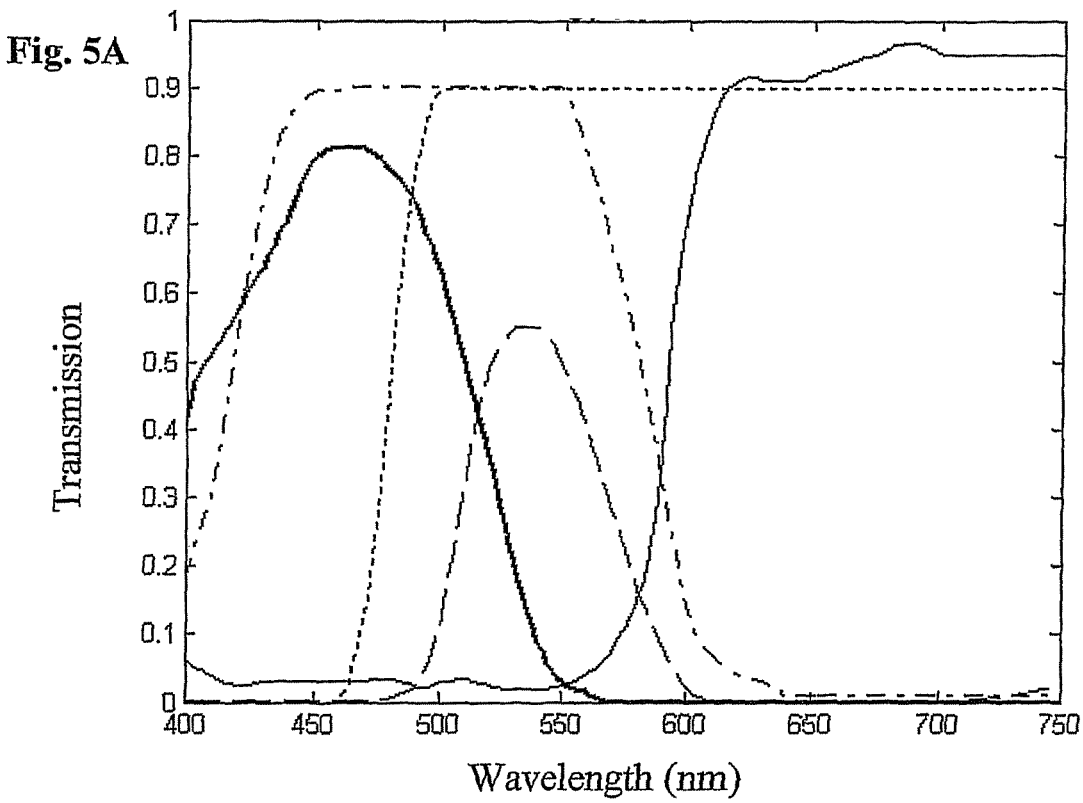
FIG. 5A is a schematic graph illustrating transmission curves of one, exemplary, filter design for a five-primary display device in accordance with an embodiment of the invention.
Figure 5B:
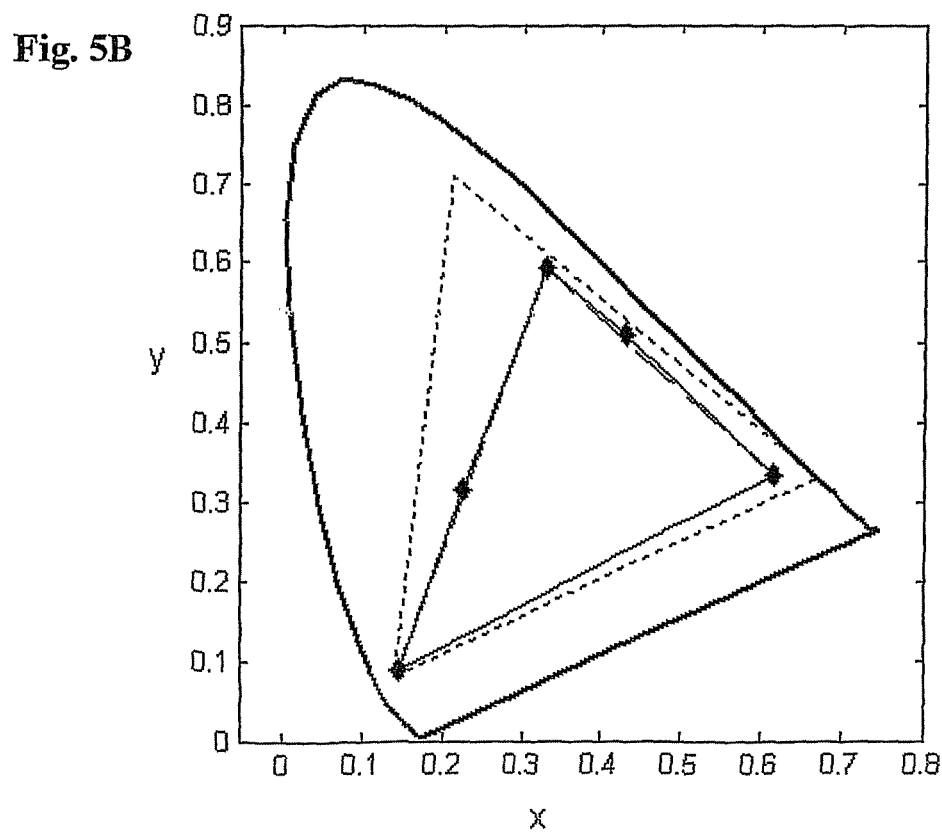
FIG. 5B is schematic illustration of a chromaticity diagram representing the color gamut of the filter design of FIG. 5A, superimposed with two exemplary prior art color gamut representations.
Figure 6A:
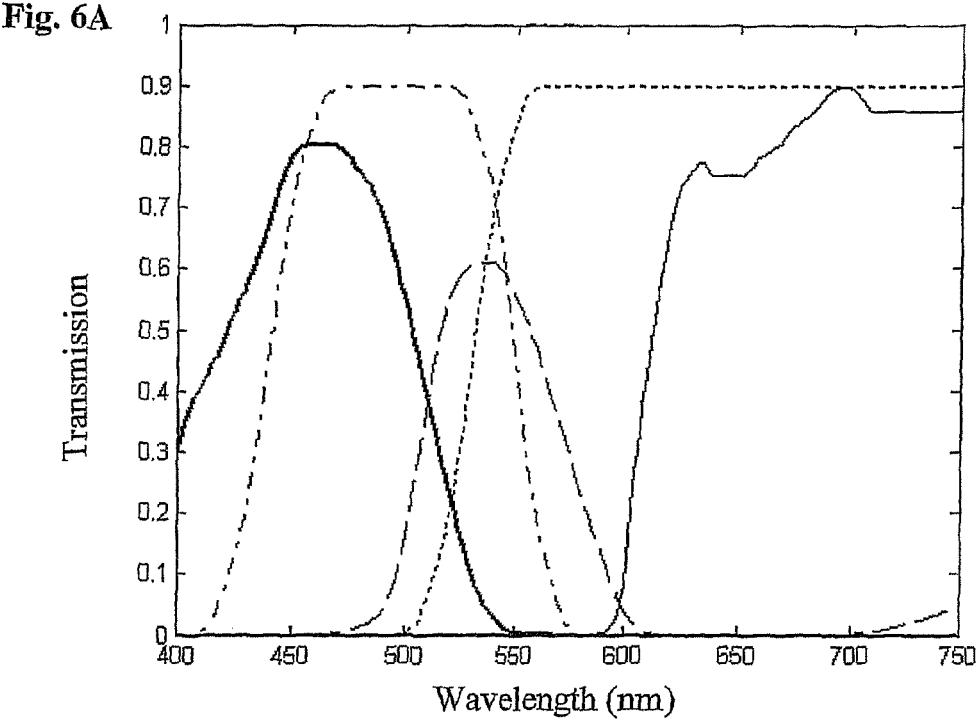
FIG. 6A is a schematic graph illustrating transmission curves of another, exemplary, filter design for a five-primary display device in accordance with an embodiment of the invention.
Figure 6B:
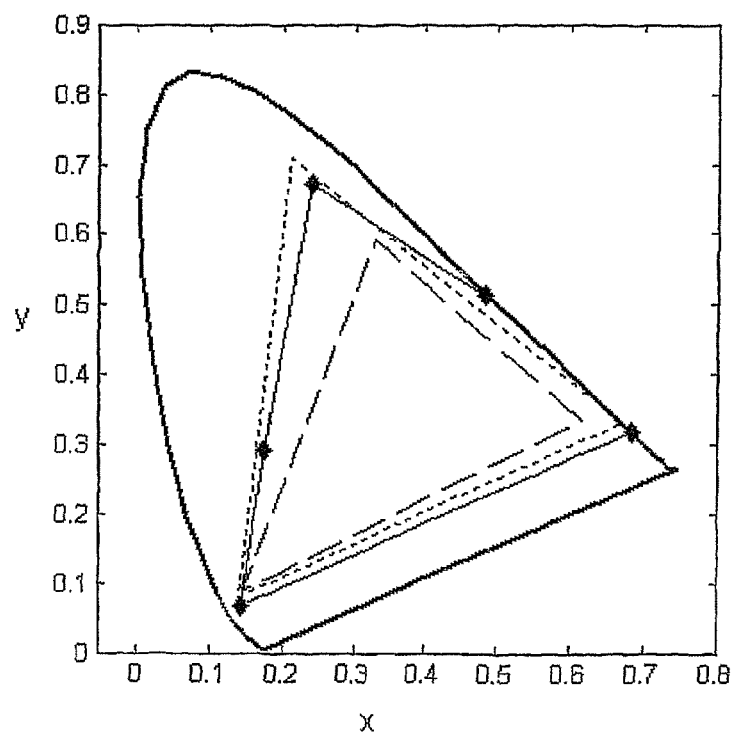
FIG. 6B is schematic illustration of a chromaticity diagram representing the color gamut of the filter design of FIG. 6A, superimposed with two exemplary prior art color gamut representations.

FIGS. 5A and 6A schematically illustrate transmission curves for two, respective, alternative designs of a five-primary display device in accordance with embodiments of the invention, wherein the five primary colors used are red (R), green (G), blue (B), cyan (C) and yellow (Y), denoted collectively RGBCY. FIGS. 5B and 6B schematically illustrate the resulting color gamut of the filter designs of FIGS.

5A and 6A, respectively. It will be appreciated that both designs produce wider gamut coverage and/or higher brightness levels than corresponding conventional three-color LCD devices, as discussed in details below. As known in the art, the normalized over-all brightness level of a conventional 3-color LCD may be calculated as follows:

$$Y(3\text{-colors})=(Y(\text{color}_1)+Y(\text{color}_2)+Y(\text{color}_3))/3$$

Analogously, the normalized brightness level of a 5-color LCD device in accordance with an embodiment of the present invention may be calculated as follows:

$$Y(5\text{-colors})=(Y(\text{color}_1)+Y(\text{color}_2)+Y(\text{color}_3)+Y(\text{color}_4)+Y(\text{color}_5))/5$$

wherein $Y(\text{color}_i)$ denotes the brightness level of the i'th primary color and Y(n-colors) denotes the over-all, nomalized, brightness level of the n-primaries display.

Figure 4A:
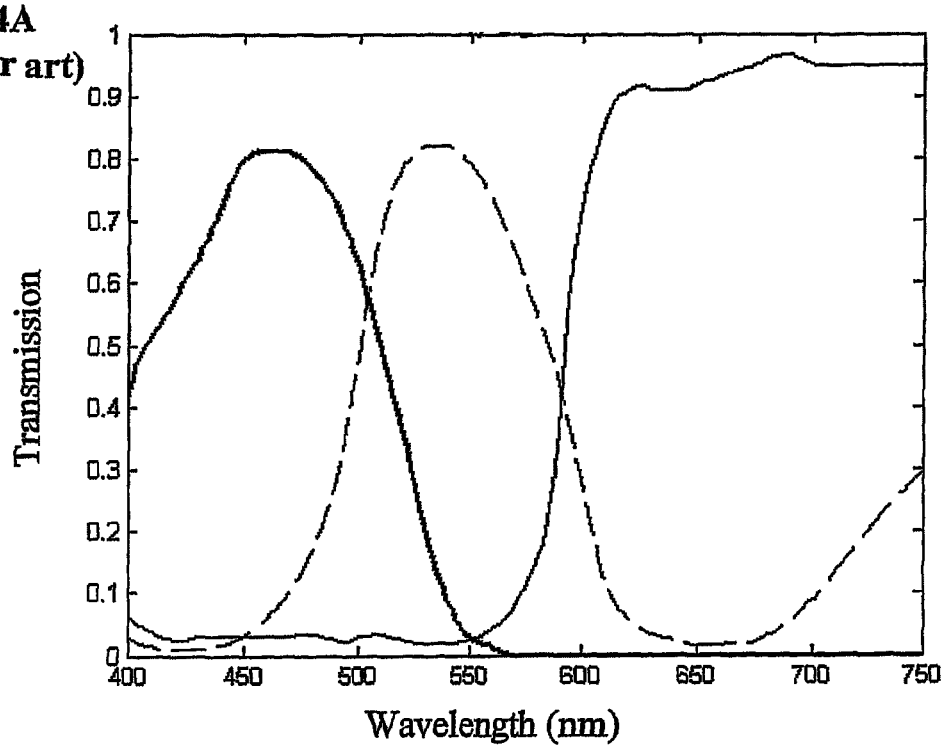
FIG. 4A is a schematic graph illustrating typical RGB filter spectra of a prior art laptop computer display.
Figure 4B:
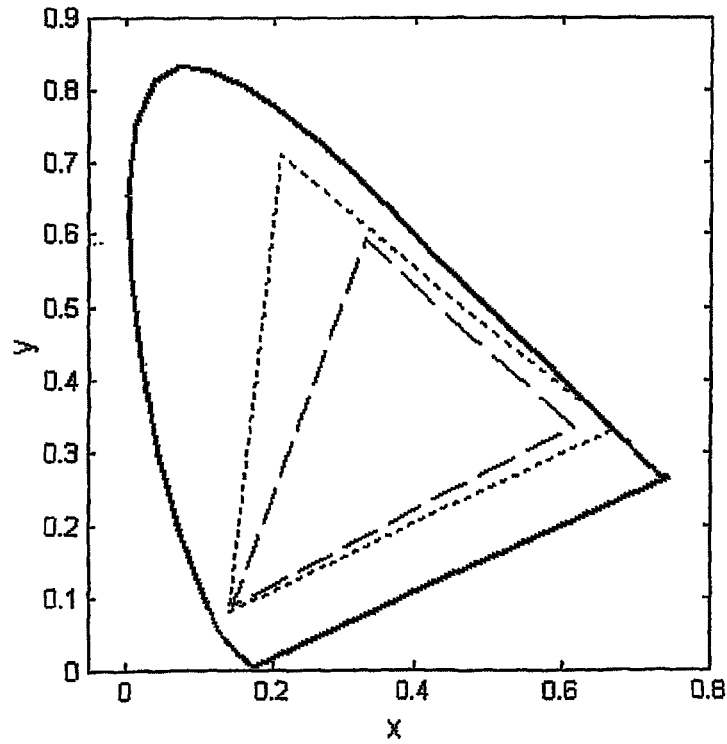
FIG. 4B is a schematic illustration of a chromaticity diagram representing the color gamut reproduced by the prior art RGB filter spectra of FIG. 4A, superimposed with an ideal prior art NTSC color gamut.

Although the color gamut illustrated in FIG. 5B is comparable with that of a corresponding 3-color LCD device (FIG. 4B), the brightness level that can be obtained using the filter design of FIG. 5A is about 50% higher than that of the corresponding 3-color LCD. The higher brightness levels achieved in this embodiment are attributed to the addition of yellow (Y) and cyan (C) color sub-pixels, which are specifically designed to have broad transmission regions and, thus, transmit more of the back-illumination than the RGB filters. This new filter selection criterion is conceptually different from the conventional selection criteria of primary color filters, which are typically designed to have narrow transmission ranges. The white point chromaticity coordinates for this embodiment, as calculated from the transmission spectra and the back-illumination spectra using methods known in the known art, are x=0.318; y=0.352.

As shown in FIG. 6B, the color gamut for the filter design of FIG. 6A is considerably wider than that of the corresponding conventional 3-color LCD (FIG. 4B), even wider than a corresponding NTSC gamut, which is the ideal reference gamut for color CRT devices, with brightness levels roughly equal to those of a conventional 3-color LCD. In this embodiment, the over-all brightness level of the 5-color LCD device is similar to that of a 3-color LCD device having a much narrower color gamut.

The white point coordinates for this embodiment, as calculated from transmission spectra and the back-illumination spectra using methods known in the known art, are x=0.310; y=0.343. Other designs may be used in embodiments of the invention, including the use of different primaries and/or additional primaries (e.g., 6 color displays), to produce higher or lower brightness levels, a wider or narrower color gamut, or any desired combination of brightness level and color gamut, as may be suitable for specific applications.

Figure 7A:
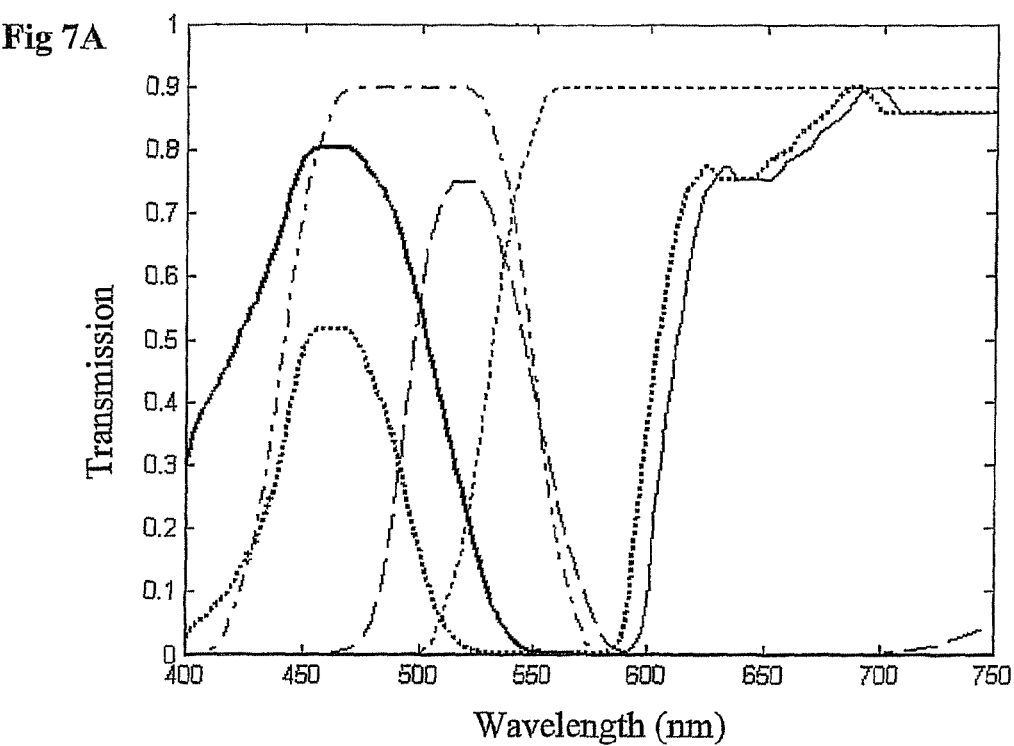
FIG. 7A is a schematic graph illustrating transmission curves of a filter design for a six-primary display device in accordance with an embodiment of the invention.
Figure 7B:
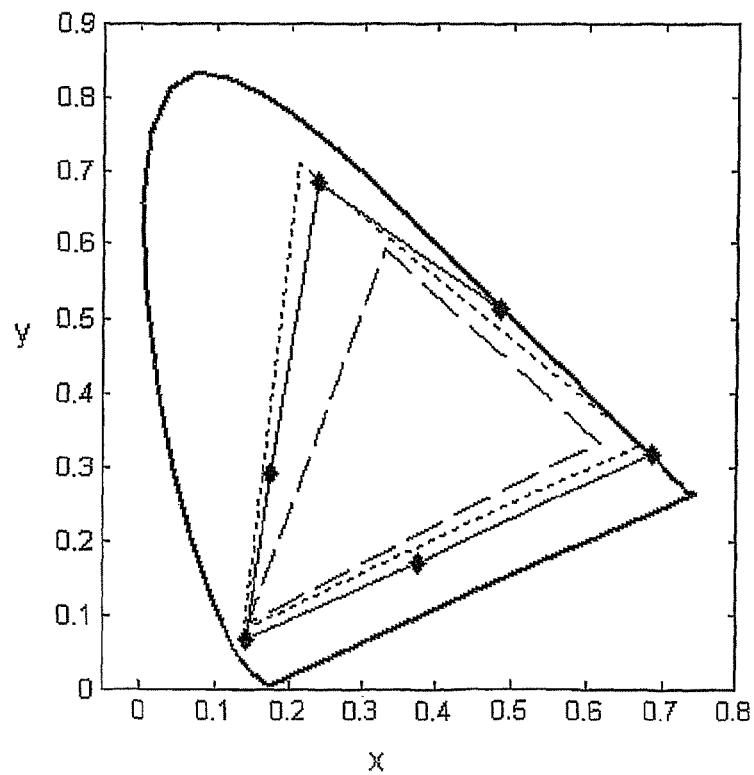
FIG. 7B is schematic illustration of a chromaticity diagram representing the color gamut of the filter design of FIG. 7A, superimposed with two exemplary prior art color gamut representations.

FIG. 7A schematically illustrates filter transmission curves of a six-primary display according to embodiments of the present invention, wherein the six primary colors are red, green, blue, cyan, magenta (M) and yellow, denoted collectively RGBCMY. FIG. 7B schematically illustrates the resulting color gamut of the filter design of FIG. 7A. The filter design of FIGS. 7A and 7B is generally similar to that of FIGS. 5A and 5B, except for the addition of a magenta (M) filter sub-pixel to each pixel. The white point coordinates for this exemplary six-primaries display are x=0.319 and y=0.321 and the brightness gain is equal to one.

Figure 15:
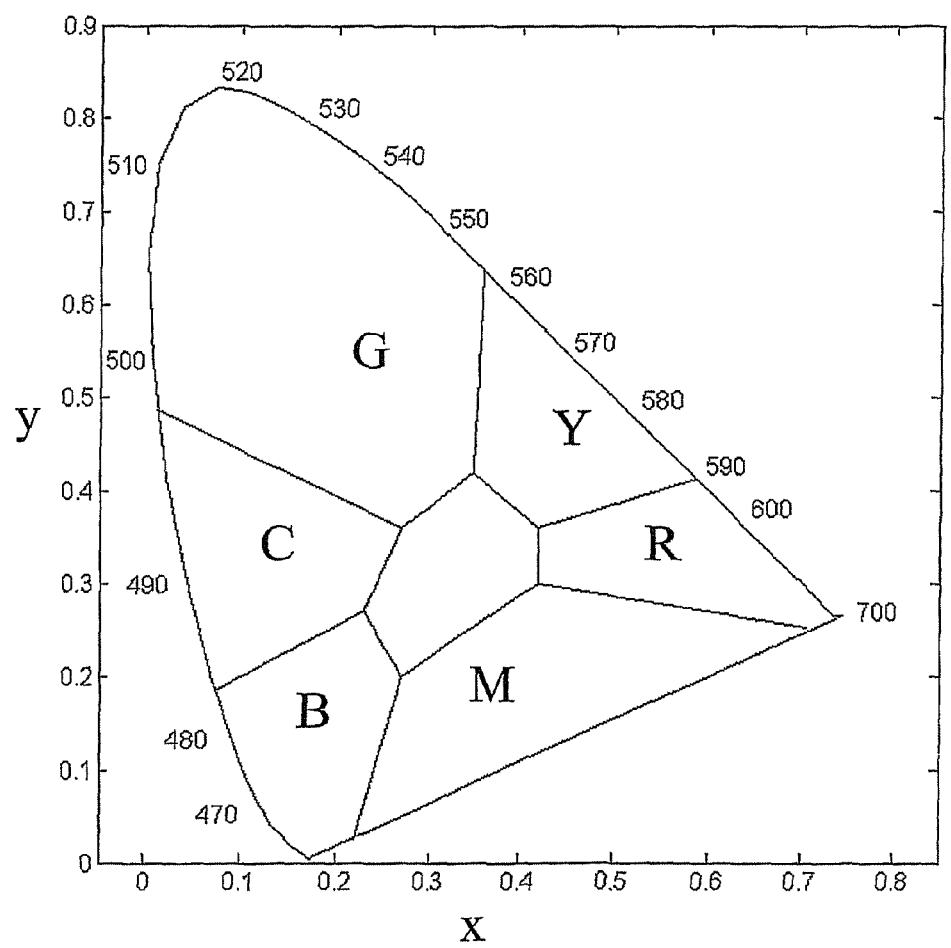
FIG. 15 is a schematic illustration of a chromaticity diagram of a human vision color gamut divided into a plurality of color sub-gamut regions.

FIG. 15 schematically illustrates a chromaticity diagram of the color gamut discernable by humans, divided into six sub-gamut regions, namely red (R), green (G), blue (B), yellow (Y), magenta (M) and cyan (C) color sub-gamut regions, that may be used for selecting effective color filters spectra in accordance with embodiments of the invention. In some embodiments, more than three primary color filters, for example, five color filters as in the embodiments of FIGS. 5A and 6A, or six color filters as in the embodiment of FIG. 7A, may be selected to produce chromaticity values within respective sub-gamut regions in FIG. 15. The exact chromaticity position selected for a given primary color within a respective sub-gamut region may be determined in accordance with specific system requirements, for example, the desired width of the color gamut in the chromaticity plane and the desired image brightness. As discussed in detail above, the system requirements depend on the specific device application, e.g., certain applications give preference to gamut size, while other applications give preference to image brightness. The sub-gamut regions in FIG. 15 represent approximated boundaries from which primary colors may be selected to provide large gamut coverage and/or high brightness levels, while maintaining a desired white point balance, in accordance with embodiments of the invention. The positions of the primary chromaticity values within the sub-gamut regions of FIG. 15, for given filter spectra selections and known back-illumination spectra, can be calculated using straightforward mathematical calculations, as are known in the art, to determine whether a desired color gamut is obtained for the given filter spectra selections.

In an embodiment of the invention, a sub-pixel rendering technique as described in detail below may be used, in conjunction with the exemplary 6-primary design described above, to significantly increase the resolution of the display. In alternate embodiments of the invention, different primaries and primary spectra designs may be used to produce desired results, in accordance with specific display applications.

In some embodiments of the device, system and method of the invention, more than three primaries can be displayed using a format compatible with a conventional 3-sub-pixel display format. As known in the art, each pixel of conventional RGB-based LCD devices is composed of three sub-pixels, namely red, green and blue. Typically, each sub-pixel has an aspect ratio of approximately 1:3, whereby the resultant pixel aspect ratio is approximately 1:1. The aspect ratio of an image is defined as the ratio of the number of pixels in a row to the number of pixels in a column. The image aspect ratio of a typical full-screen LCD display is approximately 4:3. The display resolution is determined by the total number of pixels, assuming the pixels are generally square and arranged in a 4:3 aspect ratio configuration. When displaying a video or graphic image of a given resolution in a window (e.g., a display pixel arrangement) of another resolution, a scaling function may be required. The scaling function may include interpolation or decimation of the original image pixel data to produce the correct number and arrangement of pixels suitable for a given screen size at the desired display resolution. For most applications, an overall pixel aspect ratio of approximately 1:1 is required. For general video and TV applications, reproducing an exact aspect ratio is not critical. In other applications, particularly in applications that require geometrical accuracy, for example, in displaying images for graphic software applications, such as Adobe PhotoShop®, software rendering methods may additionally be used to compensate for pixel size "distortions".

There are many possible ways of arranging the sub-pixels of a more-than-three-primaries device in accordance with embodiments of the invention, as described below, such that a pixel aspect ratio of approximately 1:1 would be maintained. The over-all resolution and the aspect ratio of an LCD device are generally determined at the hardware level, e.g., by the number of LC cells in the LC array of the device. Although it is possible to change the geometric design of an existing LCD device, for example, to design a new sub-pixel layout with a sub-pixel aspect ratio other than 1:3, such design change may be expensive and thus undesirable. Therefore, in some embodiments of invention, a conventional sub-pixel aspect ratio of 1:3 may be maintained by arranging the sub-pixels in efficient configurations as described below. Such configurations may have an aspect ratio as close as possible to 1:1, and the configurations may include periodic patterns of more-than-three sub-pixel filters that can be illuminated by corresponding cells of the LC arrays used in standard RGB displays, obviating the need to design a new type of display, e.g., a new TFT active matrix design. The option of integrating the features of the present invention into existing display designs is a significant advantage of embodiments of the invention, because re-designing of basic display components, particularly designing a new type of TFT active matrix, may be extremely complicated and costly.

The periodic sub-pixel patterns mentioned above, hereinafter referred to as "super-pixel" structures, may contain several color sub-pixels, for example, at least one sub-pixel for each of the more-than-three primaries. As discussed above, to avoid redesigning of basic display components, the super-pixel structures may be designed to fit existing RGB sub-pixel array formats. Assuming a rectangular super-pixel structure, in accordance with some embodiments of the invention, each super-pixel may include m×k sub-pixels, whereby the number of n-primary pixels (n>3) in the super-pixel structure is equal to (m×k)/n. Because the number of n-primary pixels in the "super-pixel" structure in also equal to $N_L \times N_W$, wherein $N_L$ and $N_W$ are the length and width of the super-pixels, measured in n-primary pixel units, the following equation holds:

$$N_L \times N_W = (m \times k)/n$$

The length of the super-pixel structure is $N_L \times L$, which is equal to m/3, and the width of the super-pixel is $N_W \times W$, which is equal to k, wherein L and W are the average length and average width, respectively, of an n-primary pixel, measured in three-cell pixel units. Therefore, the average aspect ratio of the n-primary pixels is given by:

$$L/W = m/(3k) \times N_W/N_L = m/(3n) N_L^{-2}$$

To determine the smallest super-pixel structure that meets the above requirements, the number of n-primary pixels lengthwise or widthwise in each super-pixel is et to a value of one, for example, $N_L=1$, whereby the aspect ratio of the multi-primary pixel is given by $m^2/3n$. Therefore, the smallest super-pixel structure would be obtained for a value of m whereby $m^2$ divided by 3n is as close as possible to one.

Figure 8:
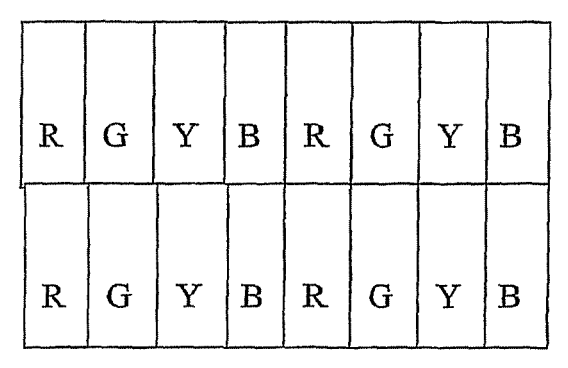

For example, a straightforward configuration for a 4-primaries display, such as a RGBY (RGB+Yellow) display system in accordance with the invention, may include arranging the sub-pixels side by side in a structure that maintains an overall image aspect ratio of 4:3, as shown schematically in FIG. 8. This configuration yields a value of m=4. In this configuration, for example, using an LC array designed for an XGA display with a 3-primary pixel resolution of 1024×768, yields an effective resolution of 768× 768 in the 4-primary multi-pixel configuration described above. Similarly, a SXGA panel with a 3-primary pixel resolution of 1280×1024 can be adapted in accordance with this embodiment of the invention to reproduce 4-primary color images at a resolution of 960×1024 pixels. It should be appreciated that the 4-primary pixel shape in accordance with this embodiment is rectangular and not square and, therefore, the image aspect ratio remains unchanged when data scaling is applied. In the embodiment of FIG. 8, the aspect ratio of the 4-primary pixels is 4:3. Therefore, for example, an XGA screen according to this embodiment of the invention may have an equal number of n-primary pixels lengthwise and widthwise and, thus, the image aspect ratio for such XGA screen remains 4:3. However, the horizontal (row) resolution of such a screen would be lower in comparison to a corresponding 3-primary XGA screen. In an embodiment of the invention, to maintain correct image geometry of this 4-primary display, the horizontal resolution of the original input data, e.g., 1024 for XGA screen, is reduced proportionally, e.g., to 768 for XGA screen. It will be appreciated by persons skilled in the art that other display formats may require different adjustments. For example, SXGA screens, at a resolution of 1280:1024, have a 5:4 aspect ratio, rather than 4:3, in 3-primaries format.

Figure 9:
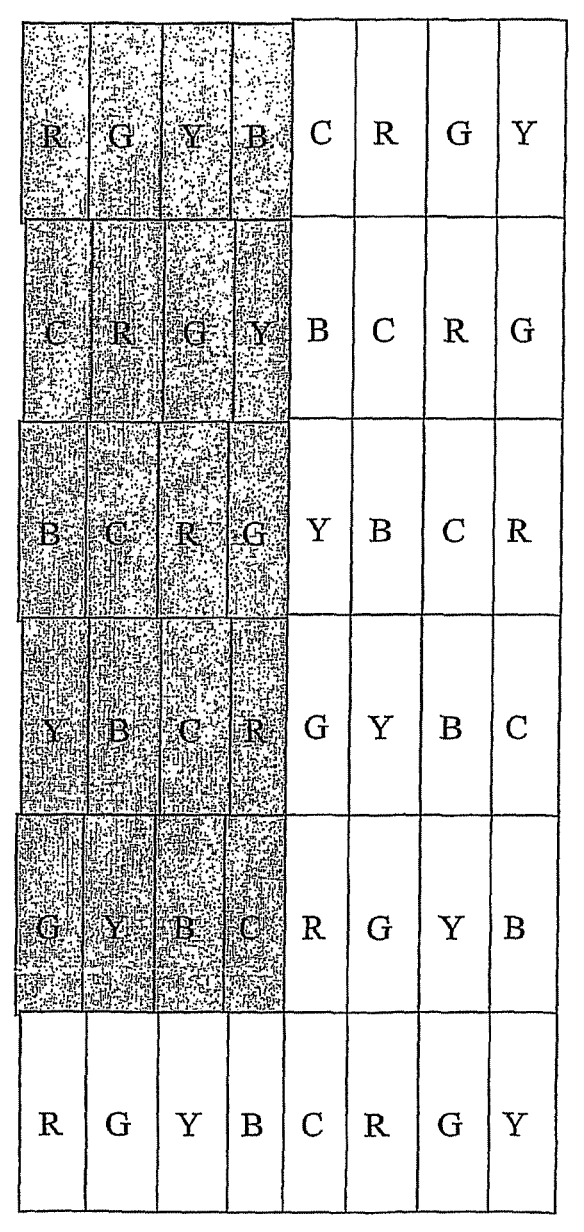

FIG. 9 schematically illustrates another example of a super-pixel configuration in a 5-primaries display system in accordance with an embodiment of the invention. In this 5-primaries configuration, wherein, for example, the primaries are RGB, cyan (C) and yellow (Y), a value of m=4 yields a 5-primary pixel aspect ratio of 16:15. In the super-pixel configuration of FIG. 9, for each pixel, the 5 sub-pixels may be divided, for example, across two consecutive rows, and the super-pixel structure includes four sets of 5-primary pixels. The aspect ratio for each super-pixel is 15:4 and, thus, the affective aspect ratio of a single 5-primary pixel is 16:15. In this configuration, for example, an LC array designed for an XGA display with a 3-primary pixel resolution of 1024×768, yields an effective 5-primary pixel resolution of 768×614. Similarly, a SXGA panel with a 3-primary pixel resolution of 1280×1024 can be adapted, in accordance with this embodiment of the invention, to reproduce 5-primary color pixel resolution of 960×819.

It should be noted that, in the above examples, the affective (color-weighted) centers of the multi-primary pixels may shift horizontally and/or vertically. This should be taken into account when input data is interpolated to match the structure of the pixel. The periodic structure of the super-pixel configuration described above allows a relatively simple interpolation process, as follows. The data for each super-pixel may be first calculated as a position on a rectangular grid of super-pixels; then the data is distributed internally within each super-pixel. Since the internal structure of the super-pixel is fixed, e.g., all super-pixels have the same sub-pixel structure, the internal distribution stage is also fixed, e.g., internal distribution is performed in the same manner regardless of the position of each super-pixel on the display. Thus, the interpolation process can be performed on a simple rectangular grid, and the complex distribution associated with the internal super-pixel structure is reduced to a fixed, repetitive, operation. Other suitable interpolation methods may also be used in conjunction with the invention.

Figure 11:
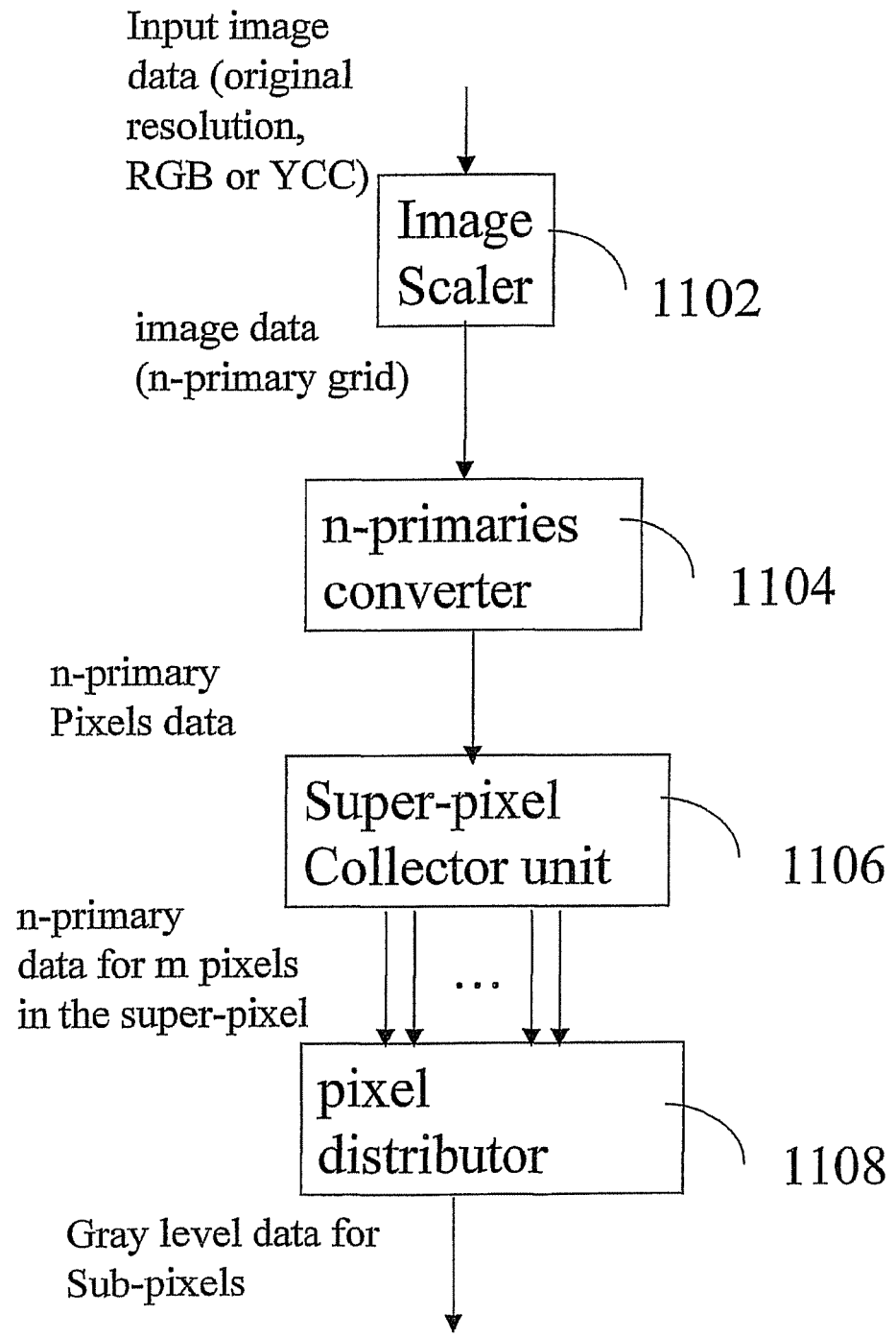
FIG. 11 is a schematic block diagram illustrating data flow in parts of an n-primary color display system in accordance with an embodiment of the invention.

A system that performs an interpolation process as described above is illustrated schematically in FIG. 11. The input data at the original resolution (e.g., in YCC or RGB format) is received by an image scaling unit 1102, which scales the image resolution, defined by the number of pixels in the image, to the resolution of the display. The scaling may be similar to the scaling performed on a personal computer (PC) with varying display resolution, as is known in the art. The data may be up-scaled to a much higher resolution and then re-sampled to the display resolution, as explained, for example, in Keith Jack, "Video Demystified", 3$^{rd}$ Edition, LLH Technology Publishing, 2001. Optionally, following the up scaling, re-sampling may be performed in two stages, to simplify computation, as follows. In a first stage, data is allocated for each of the super-pixels. In a second stage, re-sampling is performed at the super-pixel level, based on the known structure of the super-pixels. After the data is re-sampled to an n-primary pixel grid, which may be defined, for example, by the color-weighted centers of each of the n-primary pixels, a set of n-primary coefficients may be computed for each of the n-primary pixels by an n-primary converter 1104. The n-primary data for all, e.g., m, n-primary pixels making-up each of the super-pixels is combined by a super-pixel collector 1106, and the collected data is received by a distributor 1108, which distributes the m*n coefficients of the m n-primary pixels to the sub-pixels according to the defined internal arrangement.

Figure 10:
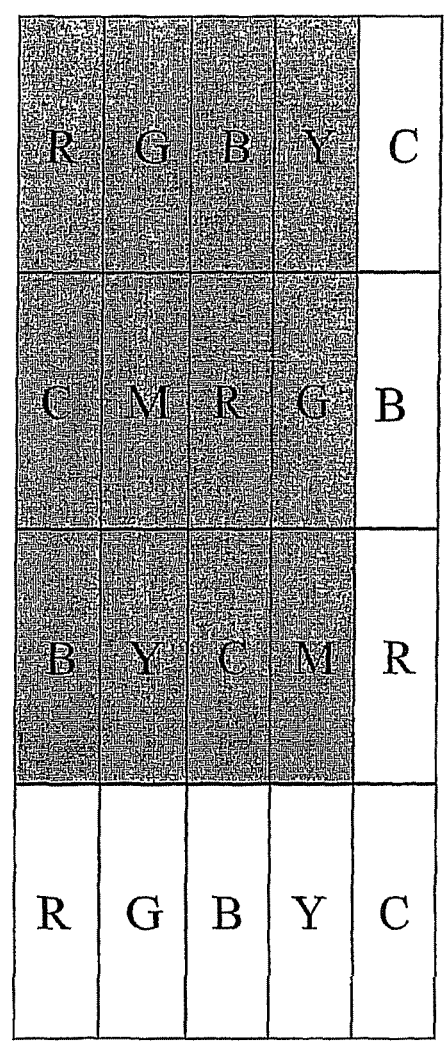
FIG. 10 is a schematic illustration of an exemplary arrangement of sub-pixels, including a super-pixel structure, in a six-primary display device according to embodiments of the invention.

In a 6-primaries display system according to an embodiment of the invention, one possible configuration may include a super-pixel arrangement essentially analogous to the 5-primaries super-pixel arrangement described above with reference to FIG. 9, with appropriate changes, e.g., adding a magenta sub-pixel element to each pixel of the super-pixel structure. A system for producing 6-primary images in accordance with this embodiment, and the flow of data in such a system, may be substantially as described above with reference to FIG. 11. As illustrated schematically in FIG. 10, a super-pixel structure with n=6 and m=4 has a length 4/3 that of a 3-primary pixel, and a width of 3 pixels. The total number of sub-pixels in this super-pixel structure is thus 4/3×3×3=12, whereby two 6-primary pixels are accommodated by each super-pixel, as illustrated schematically by the shadowed area in FIG. 10. The average length of this 6-primary pixel is 4/3 and its width is 3/2 and thus the super-pixel aspect ratio in this embodiment is 8:9, which is relatively close to the desired 1:1 ratio.

Other configurations may also be used in accordance with embodiments of the invention; for example, the six sub-pixels may be arranged in two rows of three sub-pixels each. In this two-row arrangement, the resolution of a standard XGA display adapted to operate in a six-primaries mode according to the invention is reduced 1024×384 pixels, and the resolution of a standard SXGA display operating in the 6-primaries mode is reduced to 1280×512. Such a configuration of pixels may be useful for TV and video applications as described below.

The above examples demonstrate that an increase in the number of different color filters, e.g., 4-6 different colors instead of 3, without appropriate modification of the LC array, may reduce the apparent resolution of the display. However, for TV and video applications this reduction in apparent resolution may not be crucial. Standard definition NTSC TV systems have a resolution of 480 lines (effectively 525 lines with blanking lines) at an interlaced field rate of 60 Hz (frame rate of 30 Hz). When digitized, the resolution of NTSC systems varies within the range of 960×480 to 352×480. PAL systems have a resolution of 576 TV lines at an interlaced field rate of 50 Hz (frame rate of 25 Hz). In digital form, the resolution of PAL systems varies within the range of 1024×576 to 480×576, depending on the aspect ratio (e.g., 4:3 or 16:9) and on the shape (e.g., rectangular or square) of the pixels. Therefore, in accordance with embodiments of the invention, existing SXGA displays can be converted into four-, five- or six-primaries display systems, as described above, that display standard definition TV images without any degradation in image resolution, because the reduced resolution of such converted devices is still higher than the resolution of standard TV image data. It should be noted that in all the cases described above, where the resolution is reduced horizontally, and in the case of five- and six-primaries where the resolution is reduced vertically, the resolution of converted display systems in accordance with embodiments of the invention are compatible with (or exceed) the resolution of NTSC systems (480 lines) and are at least very close to the resolution of PAL systems (576 lines). In certain cases where an XGA display is converted to operate as a 4-6 primary display, some resolution may be lost; however, a sophisticated arrangement of the sub-pixels within each pixel, as described below, can be used to compensate for the slightly decreased resolution. Thus, it will be apparent to a person skilled in the art that many existing types of 3-color LCD devices can be converted into more-than-three-primary displays, according to embodiments of the invention, capable of displaying TV standard images with no effective reduction in resolution. Other resolutions, number of primaries and pixel arrangements may be used in accordance with embodiments of the invention.

Figure 12A:
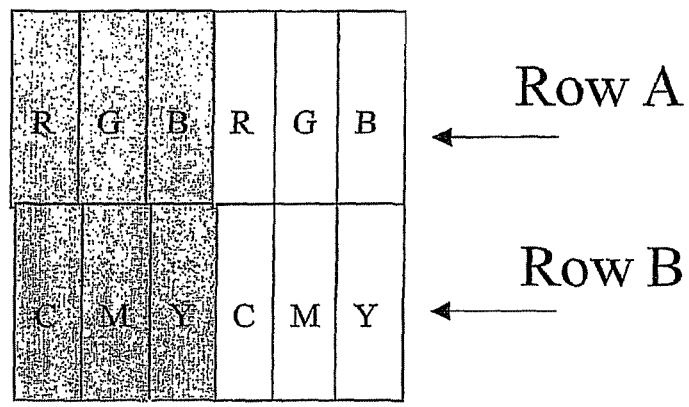
FIG. 12A is a schematic illustration depicting one exemplary pixel arrangement for a six-primary color display device in accordance with embodiments of the invention.

In various applications, especially in mixed video and computer graphics applications, any loss of resolution should preferably be avoided. For pixels with six sub-pixels arranged in two rows, as described above, special arrangement of the different sub-pixel colors can be implemented to improve the display resolution. An example of such an arrangement is shown in FIG. 12A. In this arrangement, the sub-pixels in each pixel are arranged in two rows, each row including three sub-pixels. Row A contains the "saturated" RGB pixels, and row B contains the "bright" CMY pixels. The CMY pixels combination can also produce less saturated RGB colors, for example, colors that are included in the triangular color gamut defined by the chromaticity values of C, M and Y. Analyzing this structure column-wise, each vertical sub-pixel pair can individually reproduce white (e.g., neutral) chromaticity, as follows: R+C; G+M; or B+Y. This is achieved by arranging the sub-pixels such that each primary color sub-pixel is positioned vertically adjacent a complementary primary color sub-pixel. Thus, using this method, the horizontal Black/White resolution for graphics applications can be increased by a factor of three.

Figure 12B:
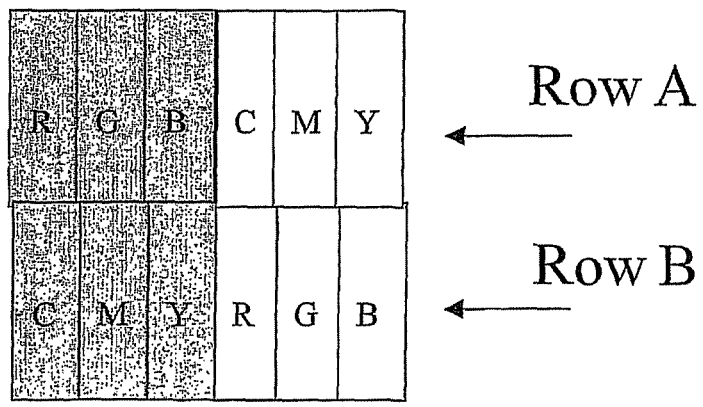
FIG. 12B is a schematic illustration depicting another exemplary pixel arrangement for a six-primary color display device in accordance with embodiments of the invention.

FIG. 12B depicts another exemplary arrangement of display pixels in accordance with embodiments of the invention. While in the arrangement of FIG. 12A, row A contains only RGB sub-pixels, and row B contains only CMY sub-pixels, in the alternative arrangement of FIG. 12B both RGB and CMY pixels are included in each row. More specifically, as shown in FIG. 12 B, row A contains the RGB sub-pixels of a first pixel followed by the CMY sub-pixels of a second pixel, and row B contains the CMY sub-pixels of the first pixel followed by the RGB pixels of the second pixel. It should be appreciated that various other pixel arrangements may also be suitable for designing super-pixel structures in accordance with embodiments of the invention; for example, in some embodiments, the order of primary colors within each triad of primaries may be different from the orders shown in the accompanying drawings.

Figure 13A:
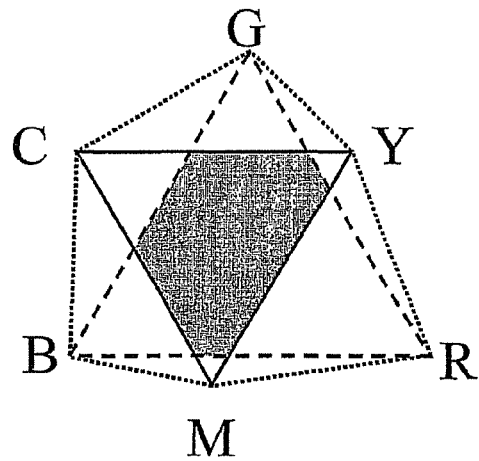
FIG. 13A is a schematic illustration of an exemplary color gamut of a six-primary display in accordance with embodiments of the invention.

The 6-primary arrangement described above allows for at least three modes of operation of a 6-primary display in accordance with the invention. FIG. 13A schematically illustrates the color gamut of such a 6-primary display on a chromaticity plane. The full color gamut is represented by the dotted line connecting the six primaries. The gamut of the RGB primaries alone is represented by the dashed triangle, and the gamut of the CMY primaries spans the solid triangle. The shadowed hexagonal area in FIG. 13A represents the conjunctive gamut of both the CMY and RGB primary sets. A first mode of operation of this display is a high resolution, "limited gamut" mode, which is suitable, inter alia, for graphics applications. In this mode, the resolution can be the same as that of a corresponding 3-primary display (e.g. 1280×1024 pixels for SXGA displays; 1024× 768 for XGA displays; etc.) The color combinations for this type of arrangement can be produced by both the RGB and CMY triads (sub-structures), whereby the color gamut of the display is defined by the conjunction of the CMY color gamut and the RGB color gamut, e.g., the shadowed hexagon in FIG. 13A. In this mode of operation, colors are handled at the three-sub-pixels level, e.g., data suitable for driving a 3-primary color display is delivered to each pixel, regardless of the set of primaries allocated to the pixel, e.g., RGB or a CMY. The difference between the RGB and the CMY pixels is in the matrix that converts the input data into the coefficients used to drive the sub-pixels. More elaborate data flows are also possible, and will be presented below.

A second mode of operation of a 6-primary display in accordance with embodiments of the invention is a medium resolution, super-wide gamut mode, designed, e.g., for video and other display applications requiring rich colors and improved color picture quality. In this mode, the resolution may gradually decrease from normal, suitable for "non-saturated color objects", that will be displayed at the full system resolution (e.g., 1280×1024 pixels for SXGA displays) to that of extremely colored "very saturated color objects" where resolution will decrease by a factor of two (1280×512 pixels). In this mode, color is handled at the six-primary pixel level and, therefore, the display resolution may be reduced. However, if the colors to be presented are not saturated, e.g., if the colors being displayed are included in the shadowed hexagon in FIG. 13A, such colors may be properly reproduced by either a RGB pixels or the CMY pixels and, therefore, the original resolution may be restored. For saturated colors outside the shadowed are in FIG. 13A, the resolution is reduced by a factor of two (1280×512 pixels); however, full resolution is not typically required for highly saturated colors because the human visual system is more sensitive to spatial variations in brightness than to spatial variations in color.

A third mode of operation of a 6-primary display in accordance with an embodiment of the invention is a super-high resolution mode, which may be used for black-and-white graphics, for example, using a SXGA display, yielding an effective resolution of 3840×1024 pixels, instead of the original 1280×1024 resolution. The arrangement and handling of the pixels for this mode of operation may be as in the high resolution, "limited gamut" mode described above. Additional modes of operation are also possible in accordance with embodiments of the invention; such additional modes may be designed in accordance with specific display requirements.

Figure 13B:
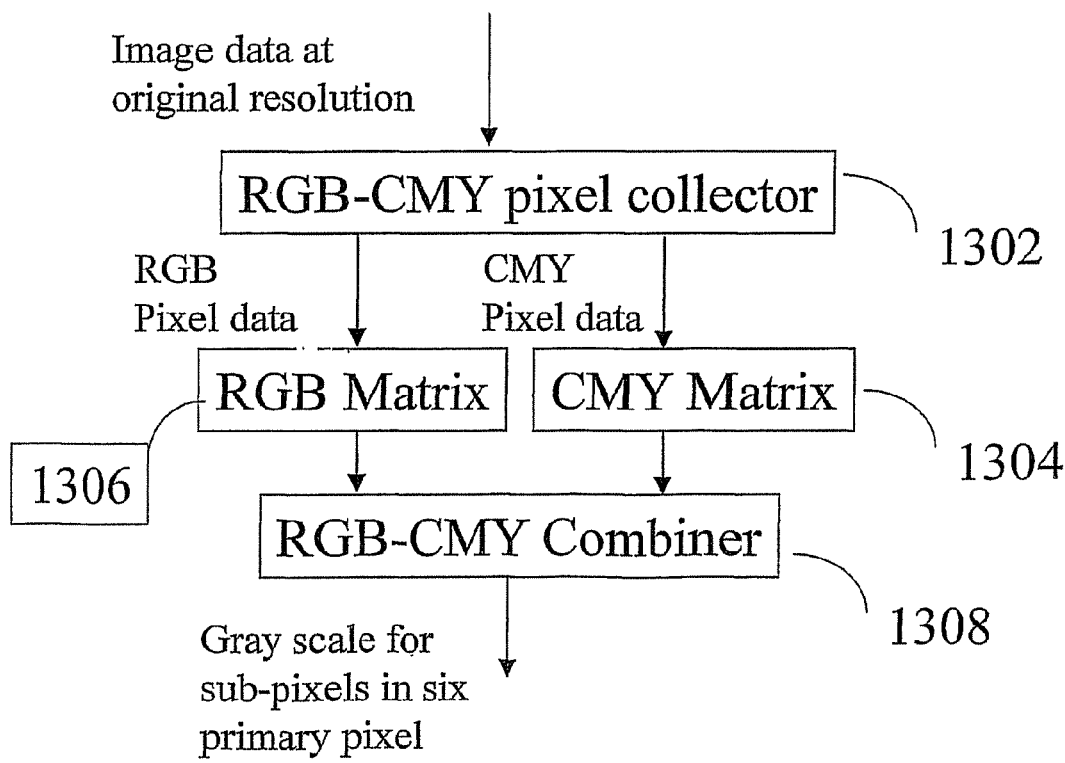
FIG. 13B is schematic block diagram illustrating a data flow scheme for a six-primary color display system in accordance with an exemplary embodiment of the invention.

FIG. 13B schematically illustrates possible data flow schemes for a 6-primary display system in accordance with exemplary embodiments of the invention, using RGB-CMY primary color sets as described above. In this example, the resolution of the input data is assumed to be at the original resolution of the display, otherwise, appropriate scaling may be required as described above. A pixel collector 1302 collects image data corresponding to a pair of three-primary pixels, namely, a RGB pixel and a CMY pixel, which together form a single 6-primary pixel. The original image data may be provided in any suitable format known in the art, for example, RGB or YCC format Using matrix multiplication units 1304 and 1306 and, subsequently, an n-primary combiner 1308, the collected data of the two three-color pixels is converted into gray-scale values for the different sub-pixels. If the color values of both pixels fall within the shadowed hexagonal area in FIG. 13A, e.g., if all the sub-pixels have positive gray scale values, then the gray levels used to drive the respective LC sub-pixels are unchanged.

Referring to FIG. 13A, when the input data falls outside the CMY triangle but within the RGB triangle, the data may be handled in a number of different manners, depending on the specific application. In one embodiment, the data is represented only by the RGB sub-pixel component, and the CMY component is set to zero illumination.

In another embodiment, the input data is represented by the RGB component, and the CMY component represents the color combination nearest the desired color. For the purpose of this embodiment of the invention, the "nearest" color combination may be defined in terms of brightness, chromaticity, or simply by setting any negative sub-pixel values to zero. In a further embodiment, the CMY component represents the color combination nearest as possible to the desired color, and any difference between the desired color and the CMY representation is corrected by the RGB component. The three different embodiments discussed above differ mainly in the method of presenting saturated colors. In the first embodiment, saturated colors are reproduced accurately, from colorimetric point of view, but at a relatively low brightness level. In the second embodiment, the brightness level is maximized, but saturation is decreased. In the third embodiment, the saturation and brightness level fall within the range in between the maximum and minimum levels of the first and second embodiments. It should be appreciated that, by transposing the references to CMY and RGB, respectively, in the above analysis, the same analysis applies to a situation in which the input data falls outside the RGB triangle but within the CMY triangle in FIG. 13A.

Referring to FIG. 13A, it should be noted that any color combination within the 6-color gamut (the peripheral dotted hexagon) that falls outside the "star of David" shape formed by the conjoined triangular areas of the RGB gamut and CMY gamut, can be reproduced accurately only by the full six-primary pixel representation. In an embodiment of the invention, an algorithm using two-dimensional look-up-tables ("LUTs"), as described in Applicants' pending International Application PCT/IL02/00410, filed May 23, 2002, entitled "System and method of data conversion for wide gamut displays", the disclosure of which is incorporated herein by reference, may be applied to derive the correct sub-pixel values for all six primaries in real time. In this embodiment of the invention, the average color of the RGB and the CMY combinations may be calculated, and the resulting color may be transformed, e.g., using a six-primary converter, to produce the sub-pixel coefficients of the corresponding n-primary pixel.

The systems and methods described above are suitable for display devices in which colors are perceived by spatial integration of the sub-pixels by the human vision system. However, color integration by the human vision system can also be performed temporally and, therefore, embodiments of the present invention also provide sequential display devices, systems and methods, for example, sequential color LCD devices, using more than three primary colors. This concept is described in detail, in the context of sequential n-primary color image projection devices, in Applicants' International Application PCT/IL01/00527, entitled "Device, System and Method For Electronic True Color Display", filed Jun. 7, 2001, and published Dec. 13, 2001 as WO 01/95544, the entire disclosure of which is incorporated herein by reference. In sequential projection color displays devices, four or more different color fields are projected sequentially, each for a short time period, and the process is repeated periodically at a sufficiently high frequency, whereby the human vision system temporally integrates the different color fields into a full color image.

An advantage of LCD devices based on sequential color representation, in accordance with embodiments of the present invention, is that such devices can display more-than-three-primary color images at a resolution comparable to the resolution at which the same devices can display three-primary-color, e.g., RGB, images. Sequential LCD display devices do not require a color sub-pixel filter matrix in registry with the LC array. Instead, each LC element controls the intensity of all the primary colors for a given pixel, each primary color being controlled during designated time slots, whereby the LC array is utilized to its full resolution. Color combinations are created by sequentially back-illuminating the LC array with different primary colors, in analogy to sequential projection devices. However, in contrast to projection devices, which typically require significant physical space to contain the projection optics, namely, the optical setup that projects a miniature spatial light modulator onto a screen, the sequential LCD device of the present invention does not require projection optics and may, thus, be implemented in flat configurations.

The architecture of a flat n-primaries display according to an embodiment of the present invention includes an LC array (panel) having a desired size and resolution. Such LCD panels are used, for example, in portable computers as are known in the art. However, in the sequential LCD devices of the present invention, the LC panel may be used without an adjacent array of color sub-pixel filters, whereby the LC array may operate as a monochromatic gray level device. The cells of the LC array are selectively attenuated to produce a series of more-than-three primary gray-level patterns, each pattern corresponding to one of more-than-three primary color components of the displayed image. Each gray-level pattern is back-illuminated with light of the corresponding primary color. Switching among the different back-illuminations colors is synchronized with the sequence of gray-level patterns produced by the LC array, whereby each gray level pattern in the sequence is illuminated with light of the correct primary color. The light for the desired back-illumination may be produced by filtering white light (or other color light) through pre-selected color filters, each filter corresponding to one of the more-than-three primary colors. The back-illumination color sequence is repeated at a sufficiently high frequency, synchronized with the periodic sequence of patterns produced by the LC array, whereby the viewer perceives a full color image by temporal integration of the as described above.

Figure 14:
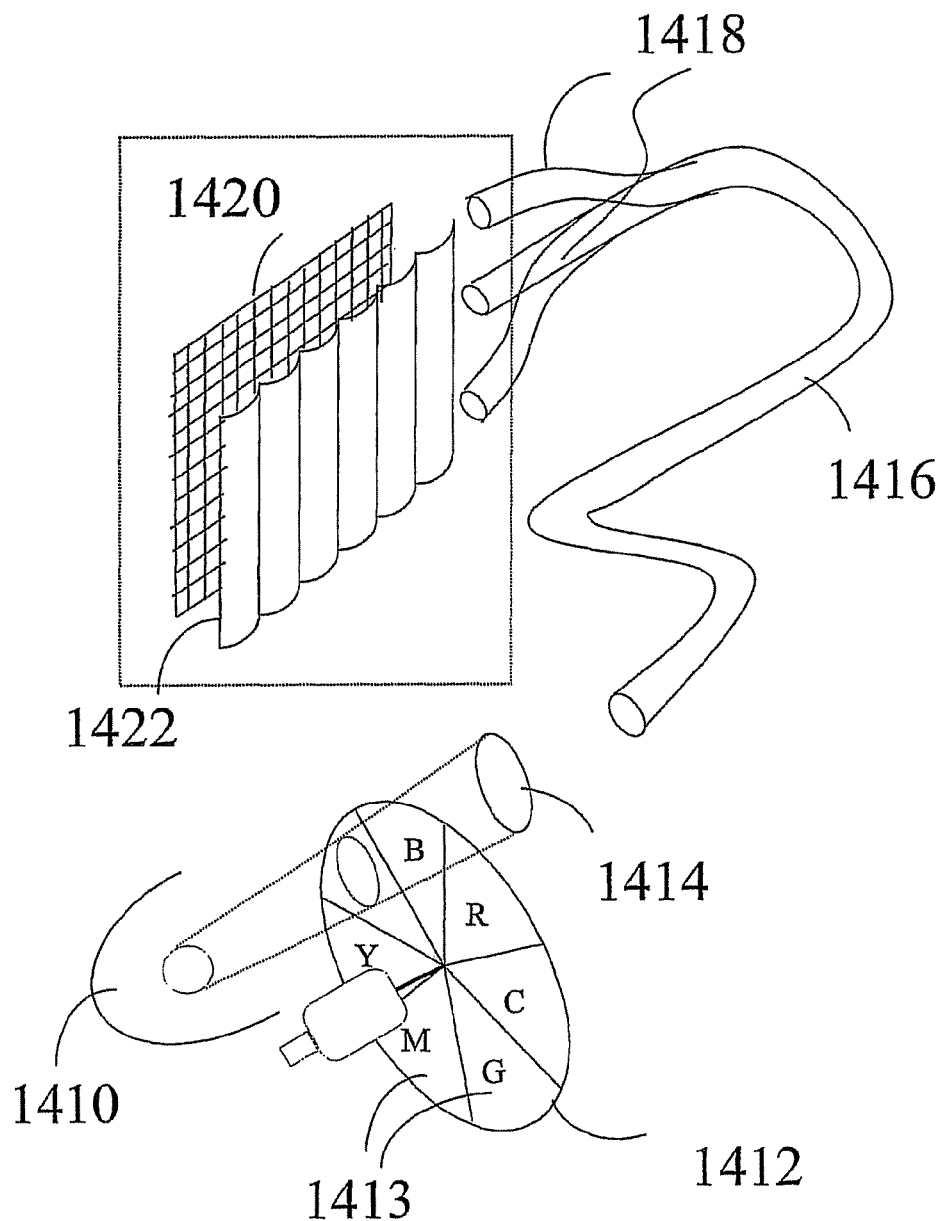
FIG. 14 is a schematic illustration of a sequential n-primary color LCD device in accordance with an exemplary embodiment of the invention.

Parts of a sequential LCD device in accordance with an embodiment of the invention are schematically illustrated in FIG. 14. It should be appreciated that the sequential color LCD devices described herein illustrate only an exemplary embodiment of the invention. In alternate embodiments of the invention, other systems and methods may be used to create the different colors of back-illumination light. Additionally or alternatively, in some embodiments of the invention, instead of using an LC array as described above, other methods known in the art may be used to sequentially produce the gray level patterns corresponding to the different primary color components.

In one embodiment of the invention, illustrated schematically in FIG. 14, the different illumination colors are produced sequentially, using a single light source, or a set of light sources, for example, a white light source 1410, by sequentially filtering the white light through a series of different color filters 1413. The color filters may be placed on a rotating filter wheel 1412. To obtain the desired back-illumination, the colored light passing through one of color filters 1413 on filter wheel 1412 may be focused, e.g., using a lens 1414, into a light guide 1416. The light guide funnels the filtered light to a back-illumination arrangement 1422 juxtaposed an LC array 1420, as known in the art, illuminating the LC array substantially uniformly. In some variations of this embodiment, the back-illumination arrangement and light guide are similar to those used in back-illuminated portable computers, e.g., laptop computers, or in light-table devices. In some such devices, light from fluorescent light bulbs is reflected by an arrangement of reflectors/diffusers to obtain substantially uniform illumination. Alternatively, as shown schematically in FIG. 14, the light funnel 1416 may include multiple light exits 1418 that may be used in conjunction with reflectors/diffusers in back-illumination arrangement 1422 to obtain uniform illumination. In alternate embodiments other structures may be used to provide back-illumination of different primary colors.

In alternate embodiments of the invention, the back-illumination is generated by an array of Light Emitting Diodes (LEDs), each LED capable of selectively producing light at one of more than three different wavelength ranges. The different color LED emissions are activated sequentially, and the color sequence is synchronized with the sequence of gray-level patterns produced by the LC array. In a three-primary, e.g., RGB, device using LED back-illumination, in order to obtain a sufficiently wide color gamut, the red, green and blue LED emissions are typically designed to have narrow respective spectra. In particular, the peak of the emission distribution of such devices is typically in the range of 630-680 nm for the red emission, 500-540 nm for the green emission, and 400-480 nm for the blue emission. Unfortunately, existing three-color devices do not utilize the brightness-efficient wavelength range of 540-570 nm, perceived as orange-yellow light, at which wavelength range the human eye is most sensitive. Therefore, adding a fourth LED emission in the range of 540-570 nm, in accordance with embodiments of the invention, can significantly improve the brightness efficiency. Assuming that the quantum efficiency of all diodes is substantially the same, a yellow LED would produce more visual brightness per Ampere. To take advantage of this efficiency, by activating the four LED emission ranges described above, in some embodiments of the invention, at least four primary colors, namely, red, green, blue and yellow-orange, are used.

In an alternative embodiment of the invention, instead of using a fourth emission range, an array of standard RGB LEDs may be activated in accordance with an activation sequence that produces a higher intensity of the desired back-illumination sequence. Instead of the standard activation sequence of R-G-B-R-G-B, some embodiments of the invention use a hybrid periodic activation sequence, for example, R-G-B-RG-BG-RB, to produce the desired back-illumination sequence. Other activation sequences of the RGB LED emissions are also possible, for example, sequences including the same emission components (e.g., R, G, B, RG, BG and RB) arranged in different orders, sequences in which some of the "mixed" components (e.g., RG, BG, or RB) are omitted, sequences including additional components (e.g., a full RGB emission component), or any other suitable combinations of "pure" and/or "mixed" LED emissions capable of produce the desired back-illumination sequence. It should be appreciated that the over-all brightness level produced by the exemplary activation sequence of R-G-B-RG-BG-RB, determined by the sum 3R+3G+3B, is about 50 percent higher than the average brightness produced by a corresponding standard R-G-B-R-G-B sequence, determined by the sum 2R+2G+2B.

The sequential LCD device in accordance with embodiments of the invention is activated at a sufficiently high frequency to enable a viewer to temporally integrate the sequence of n-primary images into a full color image. Additionally, to produce a video image, the sequential LCD device in accordance with embodiments of the invention is activated at a sufficiently high rate to enable reproduction of the required number of frames per second. A sequential color LCD device that operates at a sufficiently fast rate, using back-illumination of three primary colors, namely, red, green a blue light, is described in Ken-ichi Takator Hirosh Imal Hidekt Asada and Masao Imai, "*Field-Sequential Smectic LCD with TFT Pixel Amplifier*", Functional Devices Research Labs, NEC Corp., Kawasaki, Kanagawa 216-8555, Japan, *SID 01 Digest*, incorporated herein by reference. In an embodiment of the present invention, a version of this three-color device is adapted to produce n-primary color images, wherein n is greater than three. In such n-primary-adapted sequential illumination device, light generated by a (preferably) white light source is filtered through n, sequentially interposed, color filters, to produce the desired sequence of n-primary color back-illumination. A filter switching mechanism, for example, a rotating filter wheel including more than three different color filters, such as the filter wheel described above with reference to FIG. 14, may be used to sequentially interpose the different color filters in light path of the back-illumination. An arrangement similar to that used in existing laptop computers may be used to funnel and diffuse the filtered light illuminating the LC array. In some embodiments, the light source and filter switching mechanism (or, alternatively, the array of LEDs described above) are housed in an external device, and a light guide is used to funnel colored light into the back-illumination arrangement of the LCD device, as described above with reference to the embodiment of FIG. 14.

It will be appreciated by persons skilled in the art that the present invention is not limited by what has been particularly shown and described hereinabove and with reference to the accompanying drawings. Rather, the invention is limited only by the following claims.

The invention claimed is:

1. A color display device for displaying an n-primary image, wherein n is greater than or equal to six, comprising an array of color sub-pixel elements including color sub-pixel elements of each of at least six different primary colors, including at least a first set of primary colors and a second set of primary colors, arranged in a periodically repeating arrangement comprising at least one color sub-pixel element of each of said at least six different primary colors, wherein each color sub-pixel in the periodically repeating arrangement is adjacent at least one color sub-pixel of a complementary primary color, wherein said periodically repeating arrangement comprises first and second adjacent rows of color sub-pixel elements, wherein the first row includes one color sub-pixel element of each of said first set of primary colors, the second row includes one color sub-pixel element of each of said second set of primary colors, and each row of said array of color sub-pixel elements includes sub-pixels of said first and second sets of primary colors, and wherein each color sub-pixel element in the first row is vertically adjacent to a color sub-pixel element of a complementary primary color in the second row.

2. A device according to claim 1 wherein said at least six different primary colors comprise red, green, blue, yellow, cyan and magenta, wherein said first set of primary colors comprises red, green and blue, wherein said second set of primary colors comprises yellow, cyan and magenta, wherein each red sub-pixel element is adjacent at least one cyan sub-pixel element, wherein each green sub-pixel element is adjacent at least one magenta sub-pixel element, and wherein each blue sub-pixel element is adjacent at least one yellow sub-pixel element.

3. A device according to claim 1 wherein said periodically repeating arrangement comprises a first sequence of color sub-pixel elements of each of said first set of primary colors and a second sequence of color sub-pixel elements of each of said second set of primary colors.

4. A device according to claim 1 wherein each row of said array of color sub-pixel elements includes sub-pixels of both said first and second sets of primary colors.

5. A device according to claim 1 wherein said n-primary display device comprises an n-primary Liquid Crystal Display (LCD) device, and wherein said array of color sub-pixel elements comprises an array of color sub-pixel filter elements including filter elements transmitting light of each of said at least six different primary colors.

6. A device according to claim 1 wherein the wavelength ranges of said at least six primary colors are selected to provide at least one of an optimal over-all brightness and an optimal color gamut width of the displayed images.

7. A color display device for displaying an n-primary image, wherein n is greater than or equal to six, wherein a first set of primary colors comprises at least three colors and a second set of primary colors comprises at least three colors, the three colors of said second set of primary colors are different from the three colors of said first set of primary colors, and wherein said first and second sets of primary colors are alternately repeated in a same row and along a column direction, the color display device, comprising:

a pixel and at least one adjacent pixel, the pixel comprising first and second adjacent rows of color sub-pixel elements, wherein:

the first row includes one color sub-pixel element of each of said first set of primary colors, the second row including one color sub-pixel element of each of said second set of primary colors, each color sub-pixel element in the first row is vertically adjacent to a color sub-pixel element of a complementary primary color in the second row, and each color sub-pixel element in the second row is vertically adjacent to a color sub-pixel element of a complementary primary color of the adjacent pixel.

* * * * *